*(12)* United States Patent
Goli et al.

(10) Patent No.: US 11,470,403 B2
(45) Date of Patent: Oct. 11, 2022

(54) METHODS AND APPARATUS FOR DETERMINING AUDIENCE METRICS ACROSS DIFFERENT MEDIA PLATFORMS

(71) Applicant: The Nielsen Company (US), LLC, New York, NY (US)

(72) Inventors: Narasimha Reddy Goli, Tampa, FL (US); Michael Allen Bivins, San Francisco, CA (US); Gangadhar Jakkula, Tampa, FL (US); Jarrell Jay Mikuta, Oldsmar, FL (US); Joseph W. Brewer, Tarpon Springs, FL (US); Kevin Rini, Tampa, FL (US); Carol A. Lynch, New York, NY (US); Michael Tierney, New York, NY (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/408,141

(22) Filed: Aug. 20, 2021

(65) Prior Publication Data
US 2022/0046333 A1   Feb. 10, 2022

Related U.S. Application Data

(63) Continuation of application No. 16/565,059, filed on Sep. 9, 2019, now Pat. No. 11,102,558, which is a (Continued)

(51) Int. Cl.
*H04N 21/433*      (2011.01)
*H04N 21/8358*     (2011.01)
(Continued)

(52) U.S. Cl.
CPC ..... *H04N 21/8358* (2013.01); *H04N 21/2407* (2013.01); *H04N 21/26603* (2013.01);
(Continued)

(58) Field of Classification Search
CPC ............ H04N 21/8358; H04N 21/433; H04N 21/44204; H04N 21/2407;
(Continued)

(56) References Cited

U.S. PATENT DOCUMENTS 6,637,029 B1   10/2003   Maissel et al.
7,743,394 B2   6/2010    Smith et al.
(Continued)

OTHER PUBLICATIONS

United States Patent and Trademark Office, "Non-Final Office Action" issued in connection with U.S. Appl. No. 15/299,055, dated Jul. 5, 2017, (12 pages).
(Continued)

*Primary Examiner* — Alazar Tilahun
(74) *Attorney, Agent, or Firm* — Hanley, Flight and Zimmerman, LLC

(57) ABSTRACT

An example includes a segment collector to: access impression records indicative of media access segments, the media access segments including start times and end times corresponding to media accessed by a panelist; and determine ones of the impression records that include a watermark corresponding to a first media platform presenting the media; a segment classifier to convert a first one of the impression records including the watermark to a converted impression record; and combine the converted impression record corresponding to the first media platform and a second impression record corresponding to a second media platform; and a media creditor to generate audience measurement metrics based on the combined impression records.

20 Claims, 15 Drawing Sheets

Related U.S. Application Data continuation of application No. 15/299,055, filed on Oct. 20, 2016, now Pat. No. 10,412,469.

(51) Int. Cl.
  *H04N 21/442* (2011.01)
  *H04N 21/24* (2011.01)
  *H04N 21/266* (2011.01)
  *H04N 21/658* (2011.01)
  *H04N 21/845* (2011.01)

(52) U.S. Cl.
  CPC ..... *H04N 21/433* (2013.01); *H04N 21/44204* (2013.01); *H04N 21/44222* (2013.01); *H04N 21/44224* (2020.08); *H04N 21/6582* (2013.01); *H04N 21/8456* (2013.01)

(58) Field of Classification Search
  CPC ....... H04N 21/26603; H04N 21/44222; H04N 21/6582; H04N 21/8456
  See application file for complete search history.

(56) References Cited

U.S. PATENT DOCUMENTS

| | | |
|---|---|---|
| 7,853,969 B2 | 12/2010 | Smith et al. |
| 8,091,101 B2 | 1/2012 | Smith et al. |
| 8,660,895 B1 | 2/2014 | Saurabh et al. |
| 8,699,855 B2 | 4/2014 | Harper et al. |
| 8,843,951 B1 | 9/2014 | Sherrets et al. |
| 8,973,023 B1 | 3/2015 | Rao et al. |
| 9,131,270 B2 | 9/2015 | Falcon |
| 9,215,489 B2 | 12/2015 | Williams et al. |
| 9,215,502 B1 | 12/2015 | Sherrets et al. |
| 9,313,294 B2 | 4/2016 | Perez et al. |
| 10,045,057 B2 | 8/2018 | Shah et al. |
| 10,412,469 B2 | 9/2019 | Goli et al. |
| 2003/0229900 A1 | 12/2003 | Reisman |
| 2008/0300965 A1 | 12/2008 | Doe |
| 2009/0307084 A1 | 12/2009 | Monighetti et al. |
| 2012/0308071 A1 | 12/2012 | Ramsdell et al. |
| 2013/0007790 A1 | 1/2013 | McMillan |
| 2013/0198792 A1 | 8/2013 | Wright et al. |
| 2013/0227293 A1 | 8/2013 | Leddy et al. |
| 2014/0229629 A1 | 8/2014 | Besehanic |
| 2015/0235672 A1 | 8/2015 | Cudak et al. |
| 2015/0341684 A1 | 11/2015 | Kitts et al. |
| 2016/0182973 A1 | 6/2016 | Winograd et al. |
| 2016/0241910 A1 | 8/2016 | Rowe |
| 2017/0064393 A1 | 3/2017 | Carlson et al. |
| 2017/0171252 A1 | 6/2017 | Xue et al. |

OTHER PUBLICATIONS

United States Patent and Trademark Office, "Non-Final Office Action" issued in connection with U.S. Appl. No. 15/299,055, dated Dec. 18, 2017, (17 pages).

United States Patent and Trademark Office, "Final Office Action" issued in connection with U.S. Appl. No. 15/299,055, dated Aug. 6, 2018, (17 pages).

United States Patent and Trademark Office, "Non-Final Office Action" issued in connection with U.S. Appl. No. 15/299,055, dated Jan. 4, 2019, (17 pages).

United States Patent and Trademark Office, "Notice of Allowance and Fee(s) Due" issued in connection with U.S. Appl. No. 15/299,055, dated May 1, 2019, (5 pages).

United States Patent and Trademark Office, "Notice of Allowance and Fee(s) Due" issued in connection with U.S. Appl. No. 16/565,059, dated Apr. 15, 2021, (8 pages).

United States Patent and Trademark Office, "Non-Final Office Action" issued in connection with U.S. Appl. No. 16/565,059, dated Oct. 16, 2020, (18 pages).

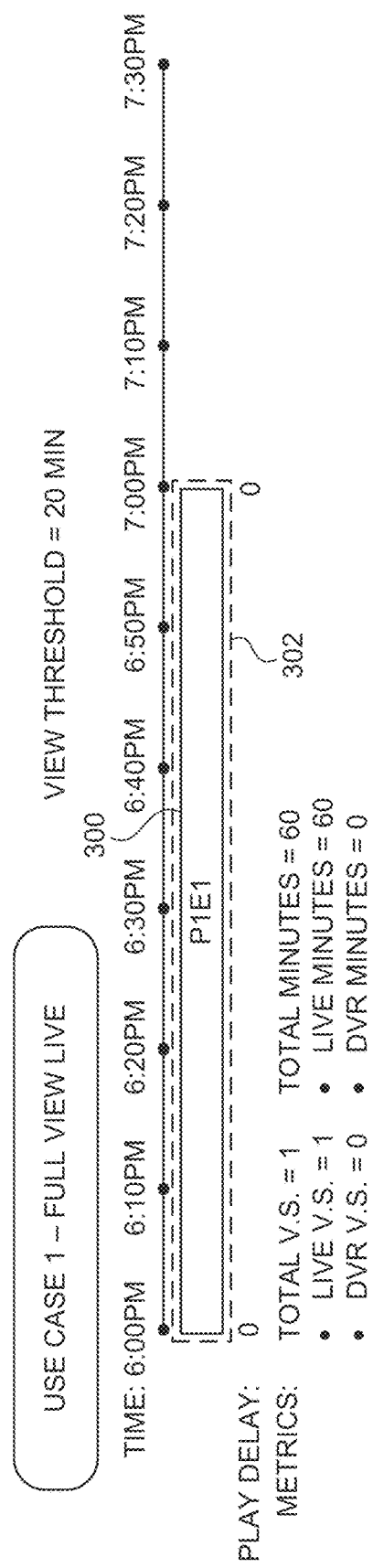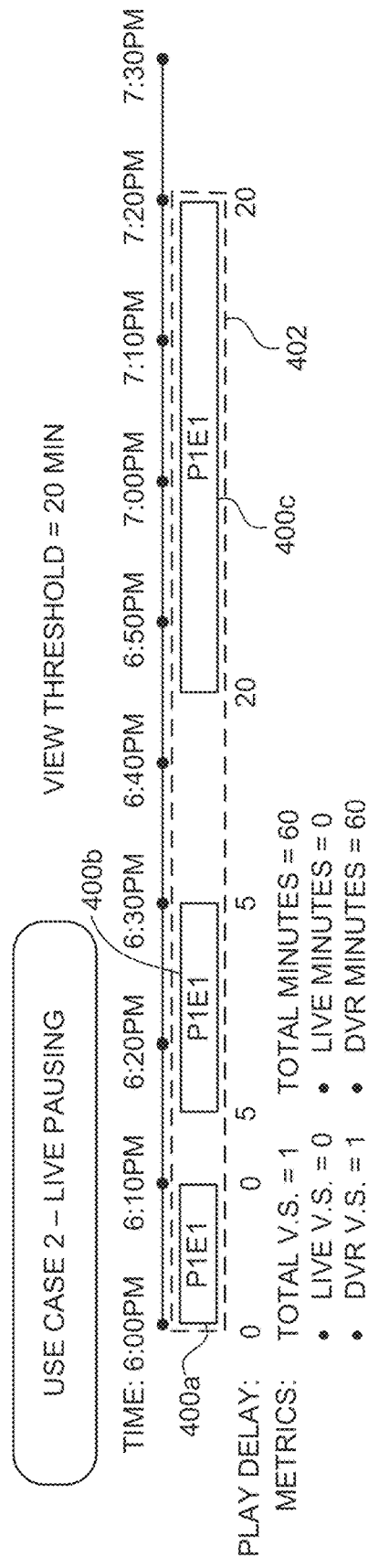

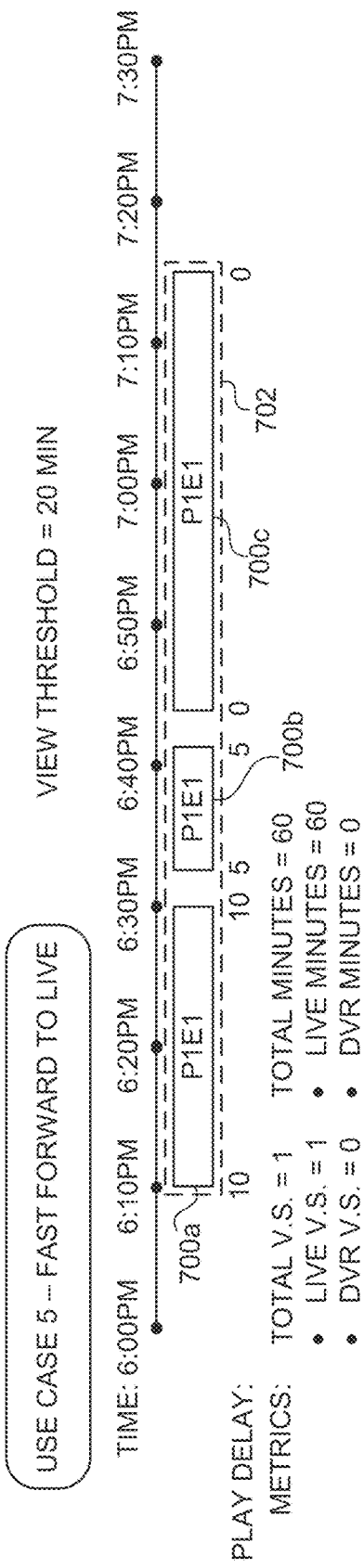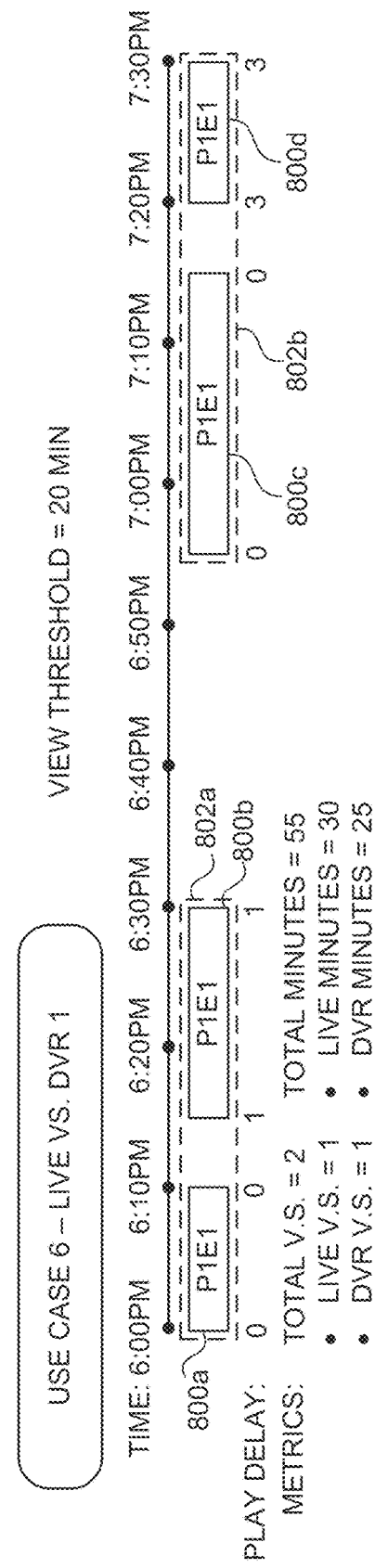

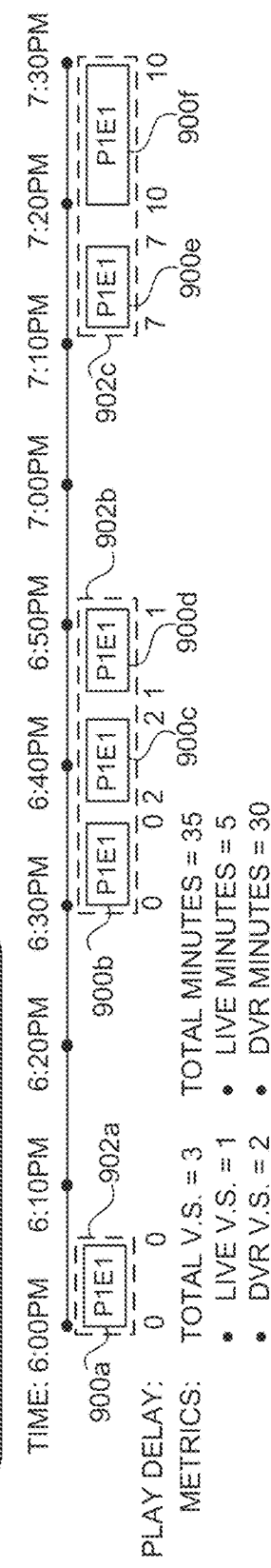
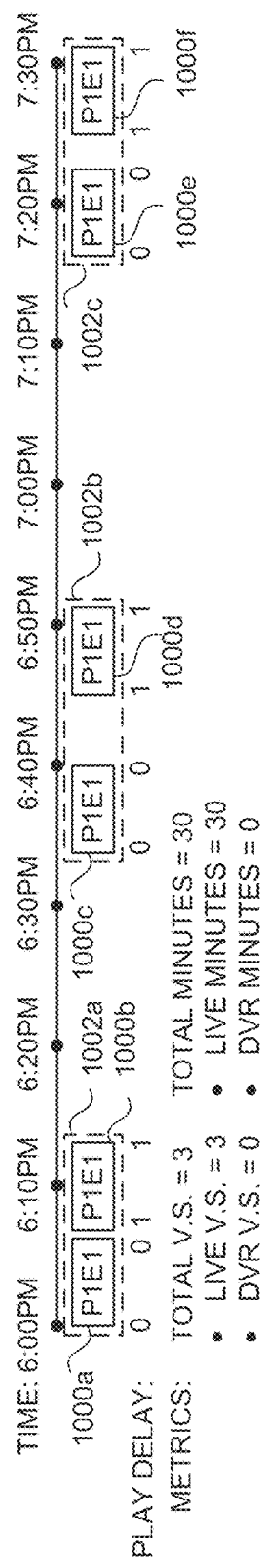

METHODS AND APPARATUS FOR DETERMINING AUDIENCE METRICS ACROSS DIFFERENT MEDIA PLATFORMS

RELATED APPLICATION

This patent arises from a continuation of U.S. patent application Ser. No. 16/565,059, which was filed on Sep. 9, 2019, which is a continuation of U.S patent application Ser. No. 15/299,055, which was filed on Oct. 20, 2016 (now U.S. Pat. No. 10,412,469), which claims benefit of Indian Patent Application Serial No. 4149/DEL/2015, which was filed in the Indian Patent Office on Dec. 17, 2015. U.S. patent application Ser. Nos. 16/565,059, 15/299,055, and Indian Patent Application Serial No. 4149/DEL/2015 are hereby incorporated herein by reference in their entireties. Priority to U.S. patent application Ser. Nos. 16/565,059, 15/299,055, and Indian Patent Application Serial No. 4149/DEL/2015 is claimed.

FIELD OF THE DISCLOSURE

This disclosure relates generally to audience measurement and, more generally, to methods and apparatus for determining audience metrics across different media platforms.

BACKGROUND

While in the past, audio and/or audio-visual media was primarily accessed via free, terrestrial broadcast of television or radio media, media may now be accessed in many different ways. For instance, cable and satellite broadcast services provide access to a large variety of channels of television, movie and radio media, typically on a subscription basis. In addition, such services also often include a video-on-demand component, allowing consumers to access media (usually for a fee) whenever they wish.

The rise in popularity of the Internet has further diversified the media delivery ecosystem, providing many new ways to access media (e.g., television, movies, radio, webpages, etc.). For example, Internet based services from entities such as Amazon, Netflix, Roku and/or others enable users to stream movies and television programs at any time. Some such services do not require subscription to a cable or satellite provider, and are sometimes referred to as over the top (OTT) services. Moreover, whereas traditional television and radio broadcasts were primarily presented at the time of receipt and, thus, viewed in a time linear fashion, Internet and other technologies have enabled media to be watched in a non-linear fashion. In particular, media from OTT and other platforms enable the presentation of media to be stopped, paused, rewound, fast forwarded and/or otherwise time shifted. Thus, the consumer can access Internet distributed media in a non-linear fashion from any of a variety of different sources.

BRIEF DESCRIPTION OF THE DRAWINGS

FIG. 3 illustrates an example first use case for a full view of live media.

FIG. 4 illustrates an example second use case for pausing of live media.

FIG. 7 illustrates an example fifth use case for fast-forward to live.

FIG. 8 illustrates an example sixth use case for live versus DVR.

FIG. 9 illustrates an example seventh use case for live versus DVR.

FIG. 10 illustrates an example eighth use case for live versus DVR.

The figures are not to scale. Wherever possible, the same reference numbers will be used throughout the drawing(s) and accompanying written description to refer to the same or like parts.

DETAILED DESCRIPTION

Figure 1:
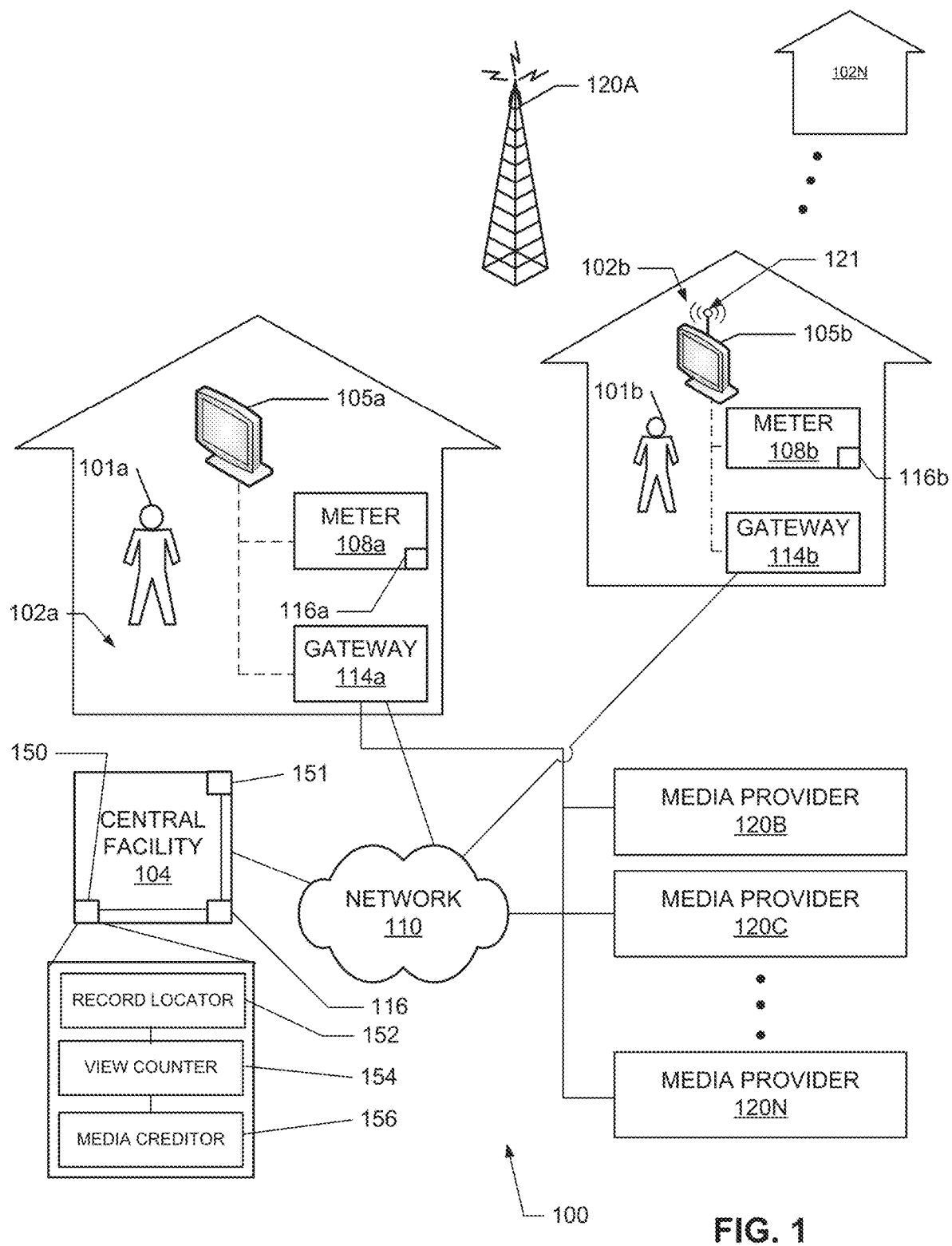
FIG. 1 is a block diagram of an example media measurement system shown in an example environment of use and including a watermark based media impression handler constructed in accordance with the teachings of this disclosure.

While in the past, audio and/or audio-visual media was primarily accessed via free, terrestrial broadcast of television or radio media, media may now be accessed in many different ways. For instance, cable and satellite broadcast services provide access to a large variety of channels of television, movies and radio media, typically on a subscription basis. In addition, such services also often include a video on demand (VOD) component, allowing consumers to access media (usually for a fee) whenever they wish.

The rise in popularity of the Internet has further diversified the media delivery ecosystem, providing many new ways to access media (e.g., television, movies, radio, webpages, etc.). For example, Internet based services from entities such as Amazon, Netflix, Roku and/or others enable users to stream movies and television programs at any time. Some such services do not require subscription to a cable or satellite provider, and are sometimes referred to as over the top (OTT) services. Moreover, whereas traditional television and radio broadcasts were primarily presented at the time of receipt and, thus, viewed in a time linear fashion, Internet and other technologies have enabled media to be watched in a non-linear fashion. In particular, media from OTT and other platforms enable the presentation of media to be stopped, paused, rewound, fast forwarded and/or otherwise time shifted. Thus, the consumer can access Internet distributed media in a non-linear fashion from any of a variety of different sources.

While this multiplication of media access opportunities and control over the media access experience has benefited consumers, it has brought many challenges to the audience measurement industry. The audience measurement industry, led by the Nielsen Company, seeks to accurately determine the size and demographic composition of the audience of various media. Traditionally when media was primarily accessed via the free terrestrial broadcast model, there were far fewer sources to measure and non-linear viewing was not an issue. In the new eco-system, it is desirable to measure media exposure across all access models. For example, it is desirable to measure the free terrestrial broadcast audience and the Internet based audience of the same television program to have a complete picture of the demographics and numbers of people exposed to that program.

Traditionally, exposure to television media (content and/or advertisements) has been measured by panel based systems. A "panel," as used herein, is a group of persons who have agreed to have, for example, their media access habits monitored by an audience measurement company. Each person participating in the panel is called a "panel member." Such panel members register to participate in the panel by agreeing to have their media exposure habits monitored and by grouping their demographic data. As an example, the commonly referred to "Nielsen family" is a household of panelists that has agreed to have their media usage habits monitored by the Nielsen Company.

Often, the media measurement company conducting such a study installs various electronics in the panelist home to automatically collect data identifying media and/or media exposure habits and return that collected data to a centralized facility at the audience measurement entity for aggregation with data from other panelists. Sometimes panelists are monitored with portable meters which are intended to be carried by the panelists. Such meters, which may be implemented by software executing on a cellular telephone or by a specially designed device (e.g., a portable people meter), are useful as they collect data representing both in home and out of home media exposure because the meter travels with the panelist throughout the day.

Media identification by such electronics has been carried out in many ways over the years. For example, utilizing the Nielsen Company's proprietary Active/Passive (AP) model, television and radio media broadcasters have encoded their media with codes (sometimes referred to as watermarks). These codes are encoded into the media in a psychoacoustic manner such that the codes can be detected by electronics (e.g., by the meter in a panelist household or a portable meter), but typically not heard by the human ear. The codes used by the Nielsen company are embedded at a high periodicity (e.g., every two seconds) and include a broadcaster identifier and a timestamp. Because the timestamps are highly granular, a computer (e.g., a server at the central facility), can quickly identify the portion of the media exposed to the panelist by comparing the watermark(s) collected by a meter located at a panelist home (or, in the case of a portable meter, carried by a panelist) against a table of reference watermarks mapping broadcaster identifiers and timestamps to media.

For a variety of reasons, Internet based media do not have the benefit of such watermarking. As an example, watermarks used in the radio or television broadcasting context, might not survive the compression and/or encryption techniques used in Internet-based media distribution. Thus, meters are provided with one or more of a variety of other techniques to identify media exposure to Internet distributed media.

As mentioned above, it is desirable to determine the audience of a given piece of media across all delivery mediums (e.g., terrestrial broadcast, cable, satellite, Internet, etc.). It is also desirable to compare the audiences of different delivery mediums in size and/or demographics to enable comparison of different media providers. To do this, it is desirable to employ a consistent set of metrics across the various media delivery platforms. Two such important base metrics are "Unique Audience" and "Duration Viewed." As used herein, "Unique Audience" refers to an unduplicated count of persons. In other words, the same person is counted only once in an audience. As used herein, "Duration Viewed", refers to the total amount of time persons viewed the media in question. Currently, the Unique Audience and Duration Viewed metrics have the same meaning in the traditional television measurement context and the Internet-based media measurement context.

A third basic measurement, namely, "views (Impressions)" as used herein refers to the count of total views. The views metric is additive, in the sense that the same person can be counted multiple times (e.g., for viewing the same media or portion(s) of the same media twice). Prior to now, the views metric has not had a consistent meaning in both the traditional television context and the Internet-based media measurement context. Indeed, it has primarily been an Internet-based media measurement metric. In the Internet-based media measurement context, the view metric is based on a view start, and indicates the number of times the media (e.g., a video) began playing. In other words, it is a count of play initiation events. Because of the control over presentation provided to the consumer in the Internet delivery context, the same media may be started and stopped multiple times. Thus, in the Internet-based media measurement context, play initiation events have been counted as separate views (impressions) if separated by a time threshold, such as one second.

The "view" metric in Television Ratings has not previously explicitly existed. Because, for example, of the granularity provided by watermarks in the television and radio contexts as explained above, it is possible to identify with precision the minutes of a given piece of media to which a panelist was exposed. Therefore, television ratings defines multiple views as a person seeing the same minute of the same media (minute of media is referenced as "MOP") multiple times. Therefore, if a person watched a television program and the minute they saw the most number of times was seen X times, then they are considered to have viewed the video X times in the television context. A similar MOPs based approach cannot be applied to the Internet based media circumstance because, for example, the granularity of media exposure tracking provided by watermarks is typically not present in the Internet context.

Therefore, to overcome the problems created by the different technologies of television, radio and Internet-based media delivery systems, examples disclosed herein will apply a new views metric in the television context. This metric, namely, a "view start," will be applied to determine when two viewing segments (e.g., exposure to two segments of the same video broadcast) are separate views or will be merged into one view based on a viewing time threshold.

FIG. 1 is a block diagram of an example media impression handling system 100, constructed in accordance with the teachings of this disclosure for determining audience metrics across different media platforms and shown is an example environment of use.

In the illustrated example of FIG. 1, an example cross-platform media ratings environment includes one or more example media presentation environments 102a-102n (where n represents any integer), such as rooms of a household (e.g., a room in a home of a panelist, such as the home of a "Nielsen family"), a mobile environment, a restaurant, a tavern, or a retail location. In the one or more example media presentation environments 102a-102n are one or more panel members or panelists 101a-101n (where n represents any integer), one or more example media presentation devices 105a-105n access media from one or more media providers 120A-120N via one or more different mediums (e.g., Internet, terrestrial RF broadcast, etc.). In the example of FIG. 1, the example media presentation environment 102a receives media distributed via the Internet (e.g., streaming media) and the example media presentation environment 102b receives over the air broadcast via the terrestrial broadcast system 120a. The example media presentation environments 102a-102n are provided with meters 108a-108n to identify the media presented by the media presentation devices 105a-105n and report media monitoring information to an example central facility 104 of an example audience measurement entity via an example network 110.

In the illustrated example of FIG. 1, the example media presentation devices 105a, 105b (e.g., a display device or television), receive media from one or more media providers 120A-120N. In FIG. 1, the example media presentation environment 102a is adapted to access media via the network 110 (e.g., an Internet-based home), whereas the example media presentation environment 102b is adapted to receive media via the RF broadcast tower 120A (e.g., a terrestrial TV-based home).

The media providers 120A-120N may be any type of media provider(s), such as, but not limited to, a cable media service provider, a radio frequency (RF) media provider, an Internet based provider (e.g., IPTV), a satellite media service provider, etc., and/or any combination thereof. As used herein, media refers to content and/or advertisements. The media may be radio media, television media, pay per view media, movies, Internet Protocol Television (IPTV) media, satellite television (TV) media, digital television media, stored media (e.g., media on a compact disk (CD), a Digital Versatile Disk (DVD), a Blu-ray disk, etc.), audio media and/or video media directed (e.g., streamed) via the Internet, a video game, targeted broadcast media, satellite broadcast media, video on demand media, and/or any other type(s) of broadcast, multicast and/or unicast media. For example, the media presentation device 110 may be implemented by a television and/or display device that supports the National Television Standards Committee (NTSC) standard, the Phase Alternating Line (PAL) standard, the Systeme Electronique pour Couleur avec Memoire (SECAM) standard, a standard developed by the Advanced Television Systems Committee (ATSC), such as high definition television (HDTV), a standard developed by the Digital Video Broadcasting (DVB) Project, etc. Advertising, such as an advertisement (e.g., to spur sales of a product or service) and/or a preview of other programming that is or will be offered by the media provider(s) 120A-120N, etc., is often interleaved with content in the media.

In examples disclosed herein, an audience measurement entity (AME) provides the meter (e.g., 108a) to the panelist (e.g., 101a). The AME configures the meter 108a to detect the panelist's 101a exposure to media and to electronically store and/or transmit monitoring information to a central facility 104. The monitoring information may be a code detected from the presented media, a signature of the presented media, an identifier of a panelist present at the time of the presentation, a timestamp of the time of the presentation and/or information derived from the monitoring information (e.g., viewing segment information, Viewing Classification information, view start information, etc.).

In the illustrated example, the media monitoring information collected by the meter 108a is transmitted (e.g., periodically or aperiodically) to the example central facility 104 via a gateway 114a through the example network 110. While the media monitoring information is transmitted to the central facility 104 by electronic transmission in the illustrated example of FIG. 1 (e.g., transmitted at a fixed interval, random interval, pseudo-random interval, upon request or polling by the central facility, etc.), the media monitoring information may additionally or alternatively be transferred in any other manner such as, for example, by physically mailing the meter 108a, by physically mailing a data store 116A or memory of the meter 108a, etc.

The network 110 of the illustrated example in FIG. 1 is a wide area network (WAN) such as the Internet. However, in some examples, local networks may additionally or alternatively be used. Moreover, the example network 110 may be implemented using any type of public or private network such as, but not limited to, the Internet, a telephone network, a local area network (LAN), a cable network, and/or a wireless network, or any combination thereof.

In some examples, the gateway (e.g., 114a, etc.) facilitates delivery of media from the media provider(s) 120A-120N to the media presentation device (e.g., 105a, etc.) via the Internet. In some examples, the example gateway (e.g., 114a) includes gateway functionality such as modem capabilities. In some other examples, the example gateway (e.g., 114a) is implemented in two or more devices (e.g., a router, a modem, a switch, a firewall, etc.). In some examples, the gateway (e.g., 114a) communicates with the network 110 via Ethernet, a digital subscriber line (DSL), a telephone line, a coaxial cable, a USB connection, a Bluetooth connection, any wireless connection, etc. to access media from one or more of the media providers 120A-120N. In some examples, the example gateway (e.g., 114a) hosts a Local Area Network (LAN) for the media presentation environment (e.g., 102a). In the illustrated example of FIG. 1, the example gateway 114a is connected to a local network (e.g., a LAN), physically or wirelessly, allowing the meter 108a, the media presentation device 105a and the gateway 114a to exchange data. In some examples, the example gateway (e.g., 114a) is implemented by a cellular communication system and may, for example, enable the meter (e.g., 108a) to transmit information to the central facility 104 using a cellular connection.

The central facility 104 of the illustrated example is implemented by one or more servers or services. The central facility 104 of this example stores and processes data received from the meter(s) 108a-108n.

As discussed above, the media delivery ecosystem is diverse and involves traditional television and/or radio broadcast (e.g., represented by terrestrial media provider 120A) and Internet-based media providers (represented by media providers 120B-120N). The central facility 104 of this example is structured to process media monitoring information for media distributed by the different systems in a manner that enables counting and comparison of the same. For example, the central facility 104 is able to determine a total audience for media distributed via the Internet and via traditional broadcast (e.g., television, etc.). To this end, the central facility 104 of FIG. 1 includes an example watermark based media impression handler 150 to handle watermarked media (e.g., non-Internet based media) and an example non-watermark based media impression handler 151 to handle non-watermarked media (e.g., Internet based media). In some examples, the example watermark based media impression handler 150 and/or subparts thereof may be distributed in one or more devices and/or one or more locations. In some examples, the central facility 104 generates report(s) for advertisers, program producers and/or other interested parties based on the data received from the meter(s) 108a-108n.

In the example of FIG. 1, the watermark based media impression handler 150 is structured to process media monitoring information collected by meters (e.g., meter 108b) monitoring media accessed via traditional broadcast (e.g., terrestrial RF television or radio, etc.) that enables it to be compared to and/or combined with media monitoring information collected by meters (e.g., meter 108a) monitoring media distributed via the Internet (e.g., "streaming media"). In the illustrated example, the media monitoring information collected for traditional broadcast media includes code(s)/watermark(s) and, thus, provides a high level of granularity into the sections of media accessed at a particular site. The watermark based media impression handler 150 of the illustrated example effectively normalizes this data to ensure views/impressions are attributed in a manner compatible with the media monitoring information collected for Internet-based media exposures. Therefore, the example watermark based media impression handler 150 of FIG. 1 solves the problem created by the lack of codes/watermarks that occur in the Internet based distribution model (e.g., due to compression, filtering, stripping and/or correcting of codes in the distribution of the Internet-based media and/or due to Internet media provider failing to encode the media).

Figure 2:
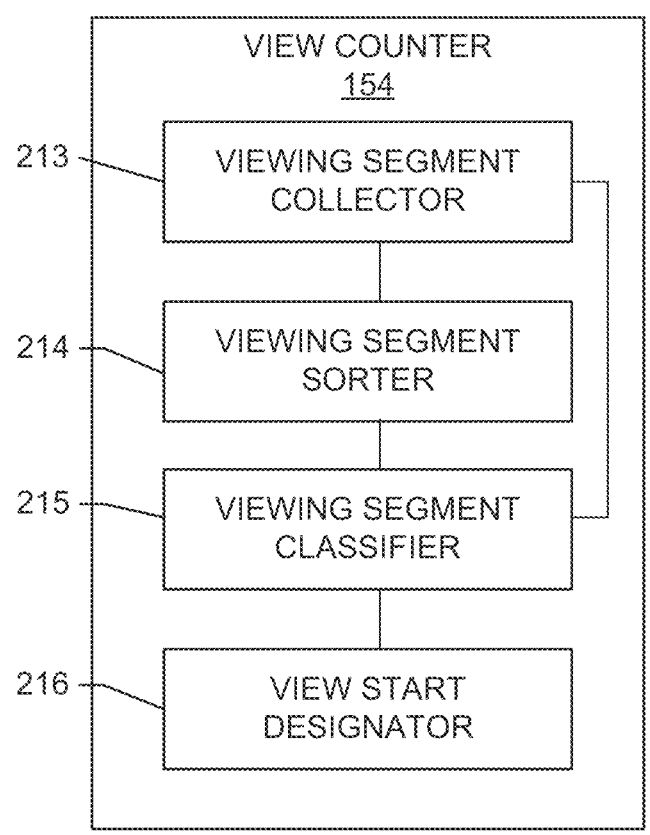
FIG. 2 is a block diagram of an example implementation of the example view counter of FIG. 1

In the example of FIG. 1, the watermark based media impression handler 150 includes a record locater 152, a view counter 154 and a media creditor 156. The record locater 152 of the illustrated example accesses, in a data store or memory device (e.g., as shown in FIG. 2, a local memory 2013, a volatile memory 2014, a non-volatile memory 2016, etc.), a first media impression record indicative of a first media access segment and a second media impression record indicative of a second media access segment. The view counter 154 analyzes the impression records accessed by the record locater 152 and, via a viewing segment collector 213, viewing segment sorter 214, viewing segment classifier 215 and view start designator 216, provide a "view" metric that facilitates, via the media creditor 156, comparison and/or combination of the records across Internet based media distribution platforms and non-Internet based media distribution platforms, such as traditional television or radio.

FIG. 2 is a block diagram illustrating an example implementation of the example view counter 154 of FIG. 1. In the example implementation of FIG. 1, the example view counter 154 includes an example viewing segment collector 213, an example viewing segment sorter 214, an example viewing segment classifier 215 and an example view start designator 216. In some examples, the view counter 154 and/or any of its components may be distributed in one or more devices, in one or more locations, remote from the central facility 104, etc. For instance, one or more of the view counter 154, the example viewing segment collector 213, the example viewing segment sorter 214, the example viewing segment classifier 215 and/or the example view start designator 216 may be integrated with the example meters 108a-108n, with the balance of the component parts, if any, implemented at the central facility 104 or at other systems or devices (e.g., media presentation devices 105a-105n).

Figure 18:
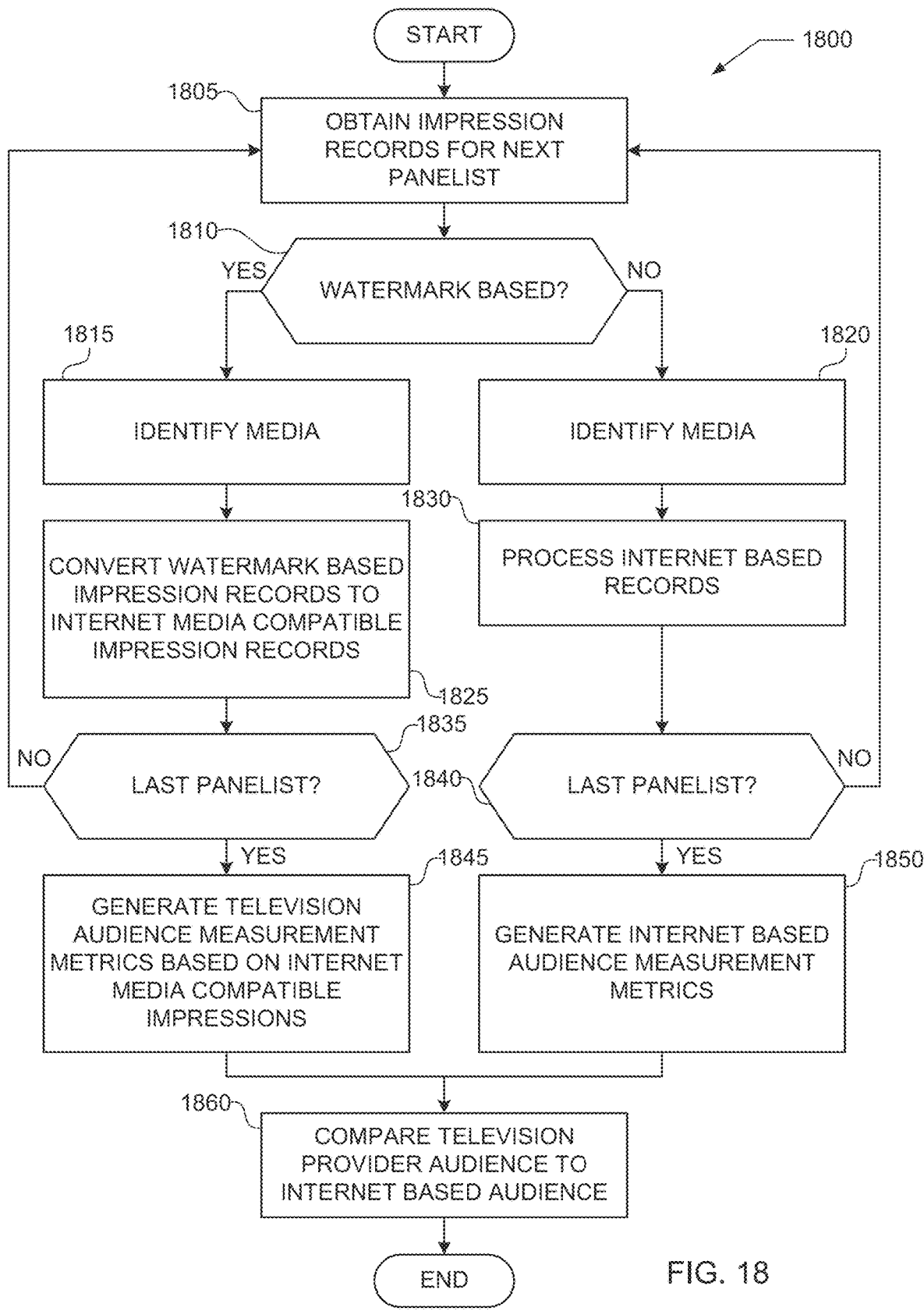
FIG. 18 is a flowchart representative of example machine readable instructions which may be executed to compare a non-Internet based audience to an Internet based audience.
Figure 19:
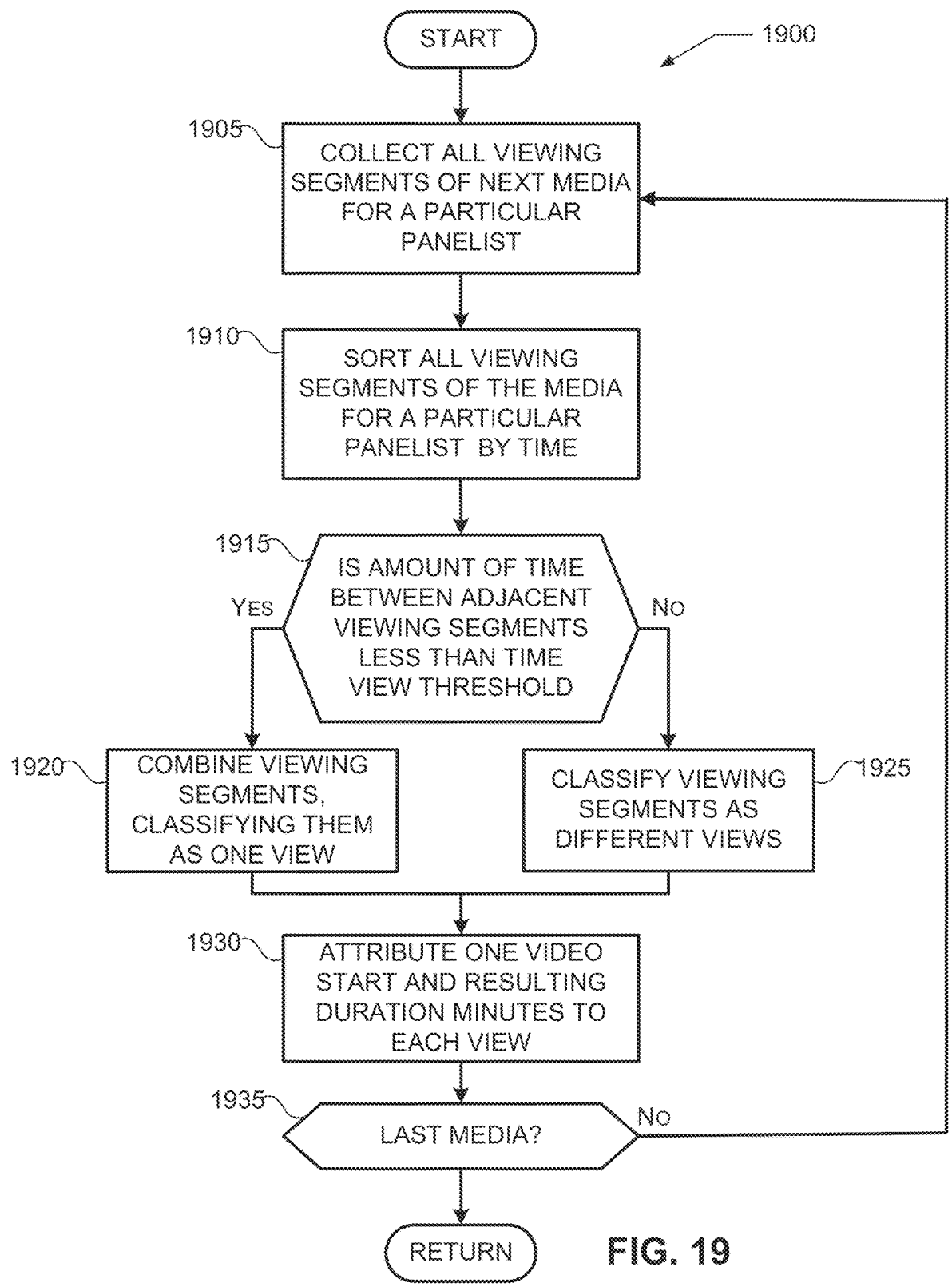
FIG. 19 is a flowchart representative of example machine readable instructions which may be executed to implement block 1845 of FIG. 18 to convert watermark based impression records to Internet-based media compatible impression records.

FIG. 2 shows an example view counter 154, which may be provided in whole or in part in the central facility 104, as shown in FIG. 1, or, in alternative examples, in the meters 108a-108n, or, in one or more other devices and/or locations. In general, the view counter 154 processes media monitoring information (e.g., start time, viewing times, etc.) received from panelists and normalizes that data to facilitate comparison and/or combination of the same across Internet based media distribution platforms and non-Internet based media distribution platforms such as traditional television or radio. An example implementation of the view counter 154 of FIGS. 1 and/or 2 is illustrated in FIGS. 18 and/or 19, which depict flowcharts representative of example machine readable instructions which may be executed to implement the view counter 154 to convert watermark based impression records to Internet-based media compatible impression records (see block 1845 of FIG. 18; FIG. 19).

While some metrics are common to both traditional media distribution platforms (e.g., television, radio, etc.) and Internet-based media distribution platforms, such as Unique Audience (e.g., the unduplicated count of persons during a reporting period) and Duration Viewed (e.g., the amount of time total persons viewed during a reporting period), other metrics are disparate and are not able to be meaningfully compared to one another. By way of example, the "view" metric in Internet-based media distribution content indicates a number of times that specific media started playing. The example watermark based media impression handler 150 newly provides a "view" metric for conventional (i.e., non-Internet based) media distribution platforms. In the illustrative examples, the example watermark based media impression handler 150 aligns the "view" metric across both non-Internet based platforms and Internet based media distribution platforms by providing a new, non-Internet based media distribution platform view start metric, which is combinable with the view start metric employed in Internet based media distribution platform measurement, to advantageously enable application of a single set of metrics across non-Internet based and Internet based media distribution platforms. This, in turn, permits development of a unified Total Content Ratings (TCR) and Total Audience Measurement that simultaneously satisfies the needs of both non-Internet based and Internet based media distribution platforms and their clients.

The example view counter 154 of FIG. 2, whether collectively provided in the example watermark based media impression handler 150, or distributed in different structures, processes media monitoring data from non-Internet based panelists to generate non-Internet based media view starts combinable with Internet based media view starts. As mentioned above, non-Internet based media is often identifiable via watermarks/code embedded in the media. This data particularly identifies times in the media presented with high granularity (e.g., every 2.5 seconds of the media may be labeled with a time stamp). Internet based media doesn't involve such watermarks. To make the data from this different platform comparable, the view counter 154 of the illustrated example processes the non-Internet based data to determine a number of view starts. To this end, the example view counter 154 of FIG. 2 includes the viewing segment collector 213, viewing segment sorter 214, viewing segment classifier 215 and view start designator 216.

The example viewing segment collector 213 of the view counter 154 collects all viewing segments (e.g., viewing events that come from a non-Internet based media meter monitoring broadcast media (e.g., TV, radio, etc.) of a specific piece of media for an identified panelist for the relevant period (e.g., second(s), minute(s), hour(s), day(s), etc.) of measurement. The media may include content and/or advertisements delivered via any type of non-Internet based distribution medium. To illustrate, FIG. 3 shows a single viewing segment 300, while FIG. 4 shows three separate viewing segments of a program P1E1 (Program 1, Episode 1), with a first viewing segment 400a from 6:00-6:10 pm, a second viewing segment 400b from 6:15 pm-6:30 pm and a third viewing segment 400c from 6:45 pm-7:20 pm. In the illustrated example, the collected viewing segments or media access segments (e.g., 400a-400x, where x can be any integer) of the specific piece of media are sorted by the viewing segment sorter 214 of the view counter 154 (e.g., chronologically sorted, etc.) for a particular panelist for the relevant period. The output of the viewing segment collector 213 and/or of the viewing segment sorter 214 are then input to the viewing segment classifier 215 of the view counter 154 for determination as to whether the viewing segments (e.g., 400a-400c in the example of FIG. 4) are to be combined into one view or identified as more than one view. This determination by the viewing segment classifier 215 is premised upon an amount of time between adjacent viewing segments wherein, if an amount of time between adjacent viewing segments (e.g., viewing occurrences or data fields that occur sequentially or are separated by a time period) is less than and/or equal to a pre-defined view threshold (e.g., any selected time period such as 1 second, 15 seconds, 30 seconds, 1 minute, 5 minutes, 10 minutes, 15 minutes, 20 minutes, 60 minutes, 61 minutes, etc.), the adjacent viewing segments are considered to be a single view.

For instance, in the example of FIG. 4, wherein a first viewing segment 400a is separated from a second viewing segment 400b by 5 minutes, which is less than the example view threshold of 20 minutes, and a third viewing segment 400c is separated from the second viewing segment 400b by 15 minutes, which is less than the example view threshold of 20 minutes, the output of the viewing segment classifier 215 is a single view 402a. In other words, the viewing segment classifier 215 combines the first, second and third viewing segments 400a, 400b, 400c into one viewing segment, thus associating one video start with the three viewing segments 400a-400c. Thus, multiple viewing segments may be combined into a single view, depending on the time period(s) therebetween.

The use case of FIG. 3 involves only one viewing segment 300, which is then classified as one view 302.

Figure 5:
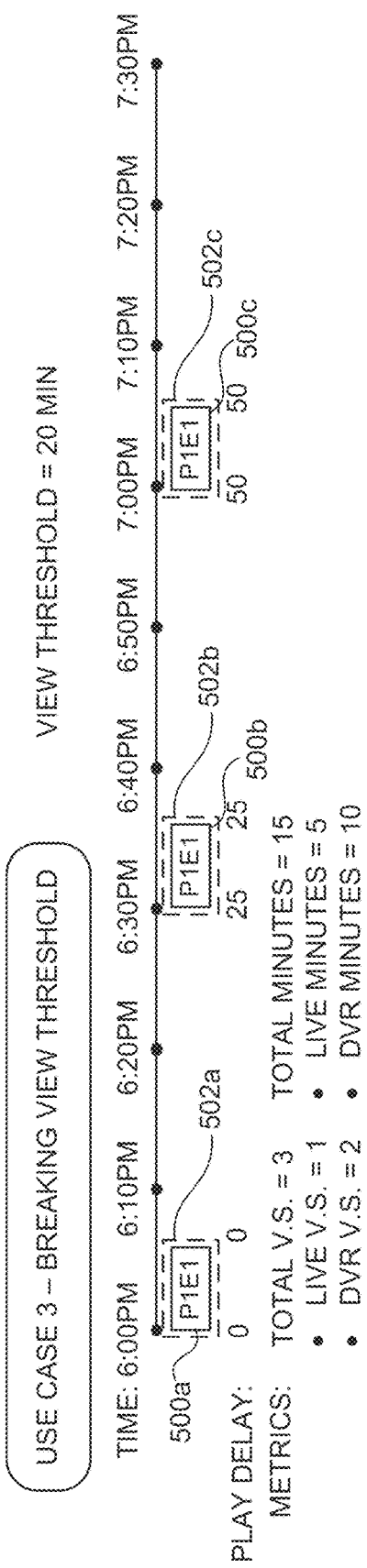
FIG. 5 illustrates an example third use case for breaking view threshold.

FIG. 5 shows another example wherein a first viewing segment 500a is separated from a second viewing segment 500b by 25 minutes, which is greater than the example view threshold of 20 minutes, and a third viewing segment 500c is separated from the second viewing segment 500b by 25 minutes, which is greater than the example view threshold of 20 minutes. In the example of FIG. 5, the viewing segment classifier 215 classifies the first, second and third viewing segments 500a-500c as three separate views 502a-502c.

Following a determination of the number of views by the viewing segment classifier 215, the view start designator 216 of the view counter 154 attributes one view start, and resulting duration, to each classified view. Further, each view start assigned by the view start designator 216 is further assigned to a specific type (e.g., Live, digital video recorder (DVR) viewing, or video-on-demand (VOD)) based on one or more characteristics of the view(s) (e.g., a live view, a DVR view, etc.). This type determination is, in some examples, also dependent on one or more weighting criteria. In some examples, the view start designator 216 assigns a "live" source to views that are associated with a greater number of "live" minutes than "DVR" minutes. In another example, the view start designator 216 assigns a "DVR" source to views wherein there is a greater number of DVR or time-shifted minutes than live minutes.

While example manners of implementing the watermark based media impression handler 150 is depicted in FIG. 1 and of implementing the view counter 154 is illustrated in FIGS. 1 and/or 2, one or more of the elements, processes and/or devices illustrated in FIG. 2 may be combined, divided, re-arranged, omitted, eliminated and/or implemented in any other way. Further, the example watermark based media impression handler 150, the example record locator 152, the example view counter 154, the example media creditor 156, the example viewing segment collector 213, the example viewing segment sorter 214, the example viewing segment classifier 215 and the example view start designator 216 of FIGS. 1 and/or 2 may be implemented by hardware, software, firmware and/or any combination of hardware, software and/or firmware. Thus, for example, any of the example watermark based media impression handler 150, the example record locator 152, the example view counter 154, the example media creditor 156, the example viewing segment collector 213, the example viewing segment sorter 214, the example viewing segment classifier 215 and the example view start designator 216 of FIGS. 1 and/or 2, or other examples expressly or implicitly disclosed herein, could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

When reading any of the apparatus or system claims of this patent to cover a purely software and/or firmware implementation, at least one of the example watermark based media impression handler 150, the example record locator 152, the example view counter 154, the example media creditor 156, the example viewing segment collector 213, the example viewing segment sorter 214, the example viewing segment classifier 215 and the example view start designator 216 of FIGS. 1 and/or 2, or other examples expressly or implicitly disclosed herein, are hereby expressly defined to include a tangible computer readable storage device or storage disk such as a memory, a digital versatile disk (DVD), a compact disk (CD), a Blu-ray disk, etc. storing the software and/or firmware. Further still, the example watermark based media impression handler 150, the example record locator 152, the example view counter 154, the example media creditor 156, the example viewing segment collector 213,the example viewing segment sorter 214, the example viewing segment classifier 215 and the example view start designator 216 of FIGS. 1 and/or 2, or other examples expressly or implicitly disclosed herein, may include one or more elements, processes and/or devices in addition to, or instead of, those illustrated in FIG. 2, and/or may include more than one of any or all of the illustrated elements, processes and devices.

Disclosed herein in FIGS. 3-12 are examples illustrating examples of a "view" metric (the "view" metric for the non-Internet based media is referred to herein as a "non-Internet based media view start" or "non-Internet based media view start ("V.S.")"). As noted above, the creation of this "view" metric facilitates alignment of non-Internet based media view starts to internet based media view starts to enable development of, for example, a Total Content Ratings (TCR) employing a single set of metrics. FIGS. 3-12 further serve to illustrate treatments of multiple live and time-shifted categories (e.g., media recorded by a digital video recorder) video viewing segments or media access segments associated with different source characteristics. Example source categories include a live category (e.g., viewing determined to occur substantially at the broadcast time) and a time-shifted category (e.g., viewing media at a time after it is broadcast via DVR, PVR, or the like). Although examples are described herein in the context of measuring non-Internet based media viewing segments, it is to be understood that the disclosed examples can be applied to measure viewing segments of media presented by any type(s), number(s), and/or combination(s) of media devices.

FIG. 3 shows an example of a first use case for a full live view. This is a simple use case, wherein a person watched a program (program 1, episode 1, or "P1E1" in FIG. 3) live from beginning to end without interruption from 6:00 pm-7:00 pm. The live viewing is also denoted by the "Play Delay" of "0" below the beginning and ending of the P1E1 viewing segment or media access segment 300 and the metric of "Live Minutes=60." The media access segment 300 itself includes, or is operatively associated with, a duration during which a person is identified as having accessed an instance of media (e.g., an episode, a commercial, a movie, a television show, a radio program, or a streamed audio-visual program). The total view starts is, accordingly, one ("Total V.S.=1") and is counted as a live view start ("Live V.S.=1").

FIG. 4 is an example of a second use case for live Pausing. This use case shows three viewing segments or media access segments, a first live viewing segment 400a from 6:00 pm-6:10 pm, a second DVR or time-shifted viewing segment 400b from 6:15 pm-6:30 pm and a third DVR or time-shifted viewing segment 400c from 6:45 pm-7:20 pm. The first time delay between the first and second viewing segment 400a, 400b and the second time delay between the second and third viewing segment 400b, 400c are each under the selected view threshold of 20 minutes (e.g., a duration of 5 minutes between the first and second viewing segments and a duration of 15 minutes between the second and third viewing segments, respectively). These three viewing segments 400a-400c are, accordingly, combined into a single view or media access session 402 of P1E1.

In this example, the view start and all of the minutes for this view or media access session 402 are attributed to the DVR or time-shifted classification, as shown in the metric "DVR V.S.=1," even though the first viewing segment 400a from 6:00 pm-6:10 pm is live. This use case highlights a convention advantageously used herein wherein the view start (V.S.) and all minutes of a view contribute to only one source classification (Live, DVR or time-shifted, or VOD). In some examples, view starts and/or minutes for different viewing segments or media access segments (e.g., 400a, 400b, 400c in the example of FIG. 4) are combined, for a single view (e.g., 402 in the example of FIG. 4), to a single source classification (e.g., "DVR V.S." in the example of FIG. 4) based on the respective weights of the different viewing segments. In some examples, if a view contains more live minutes than DVR or time-shifted minutes, the entire view and view start is designated as live. In some examples, if a view contains more DVR or time-shifted minutes than live minutes, the entire view is designated as DVR or time-shifted. In some examples, if a view contains equal live and DVR or time-shifted minutes, the entire view is designated as live. Alternatively, in other examples, if a view contains equal live and DVR or time-shifted minutes, the entire view is designated as DVR or time-shifted.

In accord with this convention, the addition of all source level view starts equals the total number of view starts overall and all minutes for a view are classified collectively as one view start, which avoids a scenario where there are minutes without a view start. In the use case of FIG. 4, the entire view or media access session 402 is designated as DVR or time-shifted viewing since the resulting view in this use case contained more DVR or time-shifted minutes than live minutes.

FIG. 5 is an example of a third use case for a "breaking view" threshold wherein a person watched P1E1 in three different video viewing segments: a first live viewing segment 500a from 6:00 pm-6:05 pm (i.e., no play delay), a second DVR or time-shifted viewing segment 500b from 6:30 pm-6:35 pm and a third DVR or time-shifted viewing segment 500c from 7:00 pm-7:05 pm. The actual time between viewing segments 500a-500b and between viewing segments 500b-500c is 25 minutes, which exceeds the set view threshold of 20 minutes. Accordingly, each of the viewing segments 500a-500c is separately classified as a view, resulting in a total of three views 502a-502c, with three view starts ("Total V.S.=3"), classified as one live view start ("Live V.S.=1") and two DVR or time-shifted view starts ("DVR V.S.=2").

Figure 6:
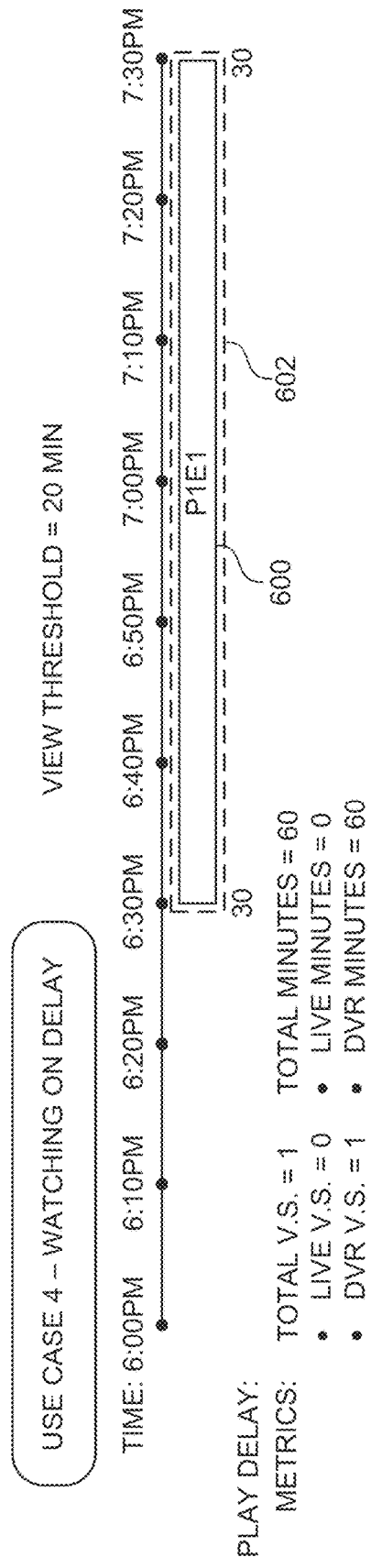
FIG. 6 illustrates an example fourth use case for watching on delay.

FIG. 6 is an example of a fourth use case for watching on delay. This example is similar to the example of FIG. 3, except that the episode (P1E1) was watched on a 30-minute delay as denoted, for example, by the "30" beneath the beginning and ending of the P1E1 viewing segment 600. This results in the same total level metrics as the first use case of FIG. 3 ("Total V.S.=1"), but the view start 602 and minutes (60 minutes) are attributed to DVR or time-shifted minutes at the source level ("DVR V.S.=1" and "DVR Minutes=60").

FIG. 7 is an example of a fifth use case for fast-forward to live. This example is similar to the use case of FIG. 4 except that, in this example, the person began the show on a delay (see, e.g., the "Play Delay" of "10") from 6:10 pm-6:30 pm, and then fast-forwarded to finish their viewing in correspondence with the live telecast from 6:45 pm-7:15 pm (e.g., "Play Delay" of "0"). This use case shows three viewing segments or media access segments 700, a first DVR or time-shifted viewing segment 700a from 6:10 pm-6:30 pm, a second DVR or time-shifted viewing segment 700b from about 6:32 pm-6:42 pm and a third live viewing segment 700c from about 6:44 pm-7:14 pm. The first time delay between the first and second viewing segment 700a, 700b and the second time delay between the second and third viewing segment 700b, 700c are each under the selected view threshold of 20 minutes and these three viewing segments 700a-700c are, accordingly, combined into a single view or media access session 702 of P1E1. This is another example where viewing segments of both live and DVR or time-shifted source are combined into a single view 702. In this example, the total DVR or time-shifted minutes (6:10 pm-6:30 pm and 6:32 pm-6:42 pm) are 30 minutes and the total live minutes (6:44 pm-7:14 pm) are 30 minutes. Based on the convention described above in relation to FIG. 4, since the DVR or time-shifted and live minutes are equal, the entire view or media access session 702 is attributed to live in this example ("Live V.S.=1" and "Live Minutes=60").

FIG. 8 is an example of a sixth use case for live versus DVR or time-shifted. In FIG. 8, four viewing segments or media access segments 800a-800d are shown. Viewing segment 800a from 6:00 pm-6:10 pm is live (e.g., "Play Delay"=0), viewing segment 800b from 6:15 pm-6:30 pm is DVR or time-shifted, viewing segment 800c from 6:55 pm-7:15 pm is live (e.g., "Play Delay"=0 and viewing segment 800d from 7:20 pm-7:30 pm is DVR or time-shifted. Since the first two viewing segments 800a-800b are separated by only 5 minutes, and the view threshold is set to 20 minutes, these first two viewing segments are combined into one view or media access session 802a. Here, the DVR or time-shifted minutes (15 minutes from 6:15 pm-6:30 pm) are greater than the live minutes (10 minutes from 6:00 pm-6:10 pm) in the first view, resulting in the entire view being considered DVR or time-shifted in accord with the convention noted above ("DVR V.S.=1"). In the latter two viewing segments 800c-800d of this example, the live minutes (20 minutes from 6:55 pm-7:15 pm) are greater than the DVR or time-shifted minutes (10 minutes from 7:20 pm-7:30 pm) and are separated in time by only 5 minutes (less than the view threshold of 20 minutes), so these two viewing segments 800c-800d are joined together and classified as one view or media access session 802b with the view being designated as live ("Live V.S.=1"). Since the first set of two viewing segments 800a-800b and the second set of two viewing segments 800c-800d are separated by 25 minutes, with the view threshold being set to 20 minutes, the first and second sets of viewing segments are treated as two distinct views in this example.

FIG. 9 is an example of a seventh use case for live versus DVR or time-shifted. In this example, six viewing segments or media access segments 900a-900f are combined into three distinct views 902a-902c separated by 25 and 21 minutes, respectively (i.e., greater than the view threshold of 20 minutes). The first view 902a (6:00 pm-6:05 pm) is live and consists of the viewing segment 900a. The second view 902b comprises the viewing segments 900b (Live—6:30 pm-6:35 pm), 900c (DVR—6:37 pm-6:42 pm) and 900d (DVR—6:45 pm-6:50 pm). The second view 902b is determined in this example to be DVR or time-shifted based on the minutes weighting of the component segments (10 minutes of DVR vs. 5 minutes of live). The third view 902c, comprising viewing segment 900e (DVR—7:11 pm-7:16 pm) and viewing segment 900f (DVR—7:20 pm-7:30 pm), is all DVR or time-shifted viewing (see, e.g., "Play Delay" of "7" and "10" respectively). In view of the above, the total view starts are three ("Total V.S.=3") with one live view start ("Live V.S.=1") and two DVR or time-shifted view starts ("DVR V.S.=2").

FIG. 10 is an example of an eighth use case for live versus DVR or time-shifted. In this example, six viewing segments or media access segments 1000a-1000f are combined into three distinct views 1002a-1002c separated by 23 and 26 minutes, respectively (i.e., greater than the view threshold of 20 minutes). The first view 1002a comprises the viewing segments 1000a (Live—6:00 pm-6:05 pm) and 1000b (DVR—6:07 pm-6:12 pm), which is designated to be live based on the occurrence of equal parts live and DVR or time-shifted, although this convention could be optionally reversed and the view 1002a designated as DVR or time-shifted. The second view 1002b comprises the viewing segments 1000c (Live—6:34 pm-6:39 pm) and 1000d (DVR—6:45 pm-6:50 pm) and is classified as live based on the occurrence of equal parts live and DVR or time-shifted. Again, this convention could be optionally reversed with the view 1002b having equal parts live and DVR or time-shifted being designated as DVR or time-shifted. These viewing segments 1000c-1000d are combined as the time between them is less than the view threshold of 20 minutes.

The third view 1002c of FIG. 10 comprises the viewing segments 1000e (Live—7:16 pm-7:21 pm) and 1000f (DVR—7:25 pm-7:30 pm) and is classified as live in this example based on the occurrence of equal parts live and DVR or time-shifted. These viewing segments 1000e-1000f are combined into view 1002c as the time between them is less than the indicated view threshold of 20 minutes. In view of the above-described views 1002a-1002c, there are three view starts ("Total V.S.=3") classified as three live view starts ("Live V.S.=3").

Figure 11A:
FIGS. 11a-11b illustrates an example ninth use case for changing channels.
Figure 11B:
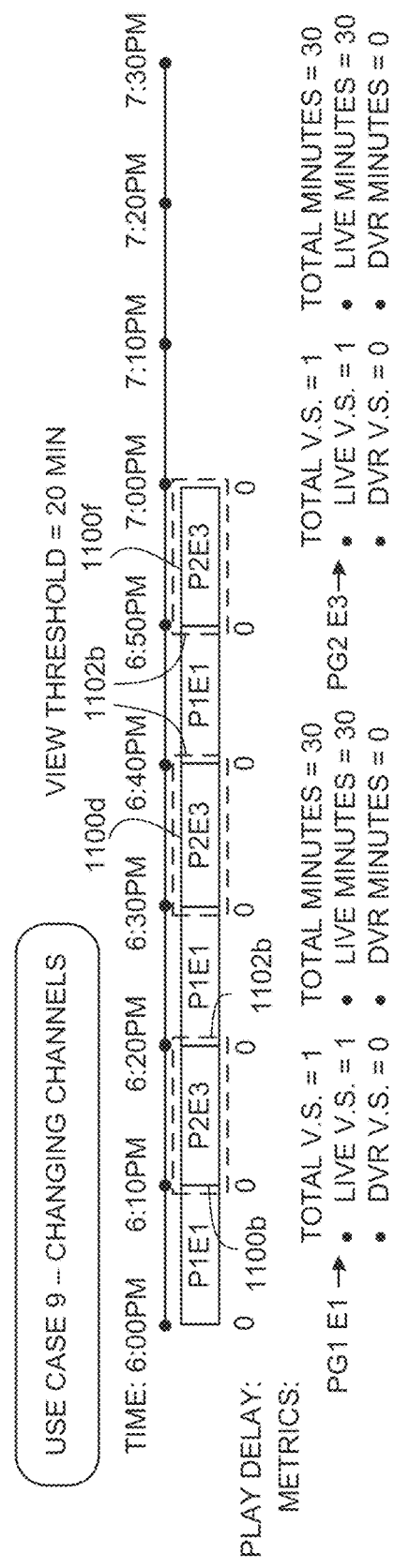

FIGS. 11a-11b show an example of a ninth use case for Changing Channels and represents a use where a person flips back and forth between two programs. When calculating view starts and minutes, the episodes are treated separately. The three live viewing segments or media access segments 1100a, 1100c and 1100e of the program P1E1 (6:00 pm-6:10 pm, 6:20 pm-6:30 pm, and 6:40 pm-6:50 pm) all have 10 minute gaps between them, which is under the given view threshold of 20 minutes, so they are combined into a single P1E1 view 1102a, as shown in the example of FIG. 11a. Accordingly, for P1E1, the total view starts in this example is one ("Total V.S.=1") and live view starts is one ("Live V.S.=1"). The example of FIG. 11b shows the same data as FIG. 11a, but highlights the three viewing segments or media access segments 1100b, 1100d, 1100f of program P2E3 (6:10 pm-6:20 pm, 6:30 pm-6:40 pm, and 6:50 pm-7:00 pm), which have 10 minute gaps therebetween and, under the given view threshold of 20 minutes, are combined and classified by the view counter 154 as single P2E3 view 1102b. For P2E3, the total view starts is one ("Total V.S.=1") and live view starts is one ("Live V.S.=1"). The duration of live minutes for each of P1E1 and P2E3 is 30 minutes.

Figure 12:
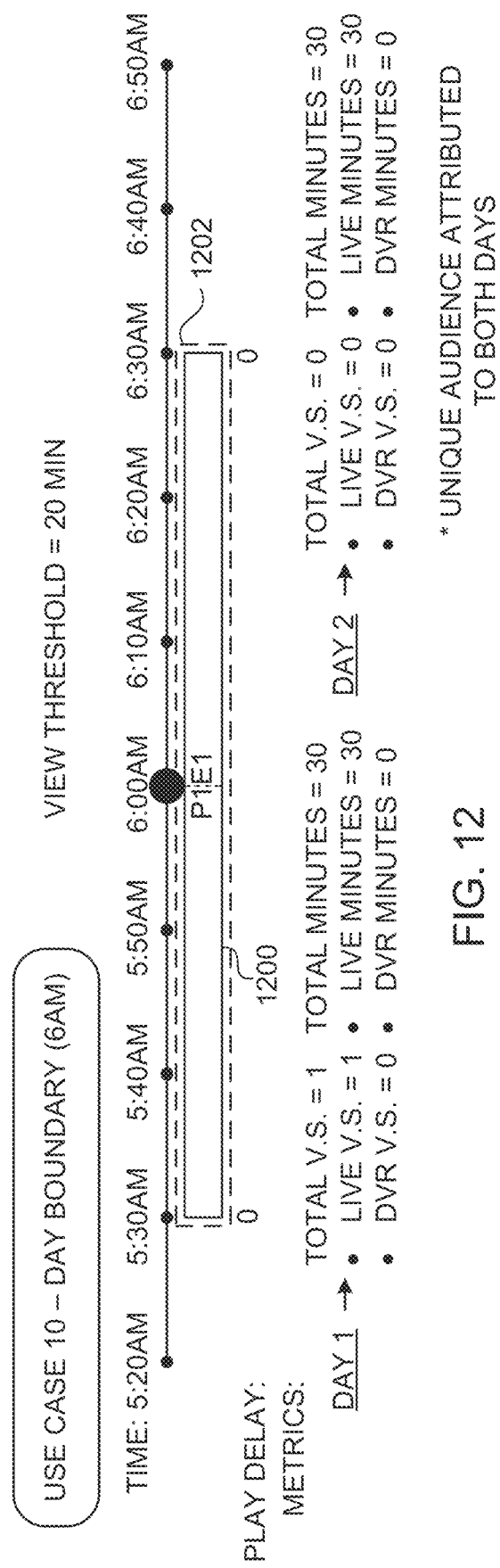
FIG. 12 illustrates an example tenth use case for day boundary crossing.

FIG. 12 is an example of a tenth use case for "day boundary". This use case represents viewing of broadcast media across an arbitrary defined time boundary (e.g., 6 am EST in the example of FIG. 12). In the example of FIG. 12, the media access session or viewing segment 1200 starts at 5:30 am, continues past the arbitrary defined time boundary of 6 am, and ends at 6:30 am. In this example, the view start is attributed to day 1, the interval prior to the boundary, whereas the minutes are attributed to the interval (e.g., day) on which the media is actually viewed. As shown, a first portion (30 minutes) of the media access session or viewing segment 1200 is attributed to "day 1" and a second portion (30 minutes) of the media access session or viewing segment 1200 is attributed to "day 2". In this example, a unique audience is attributed to both days. Thus, when a media access session or viewing segment has a duration that extends beyond an arbitrary defined time boundary, a program or method in accord with at least some examples disclosed herein (e.g., program 1900 in FIG. 19) attributes a duration of a first portion of the media access session preceding the boundary to a first interval (e.g., day 1, etc.) and attributes a duration of a second portion of the media access session following the boundary to a second interval (e.g., day 2, etc.) following the boundary.

Figure 13:
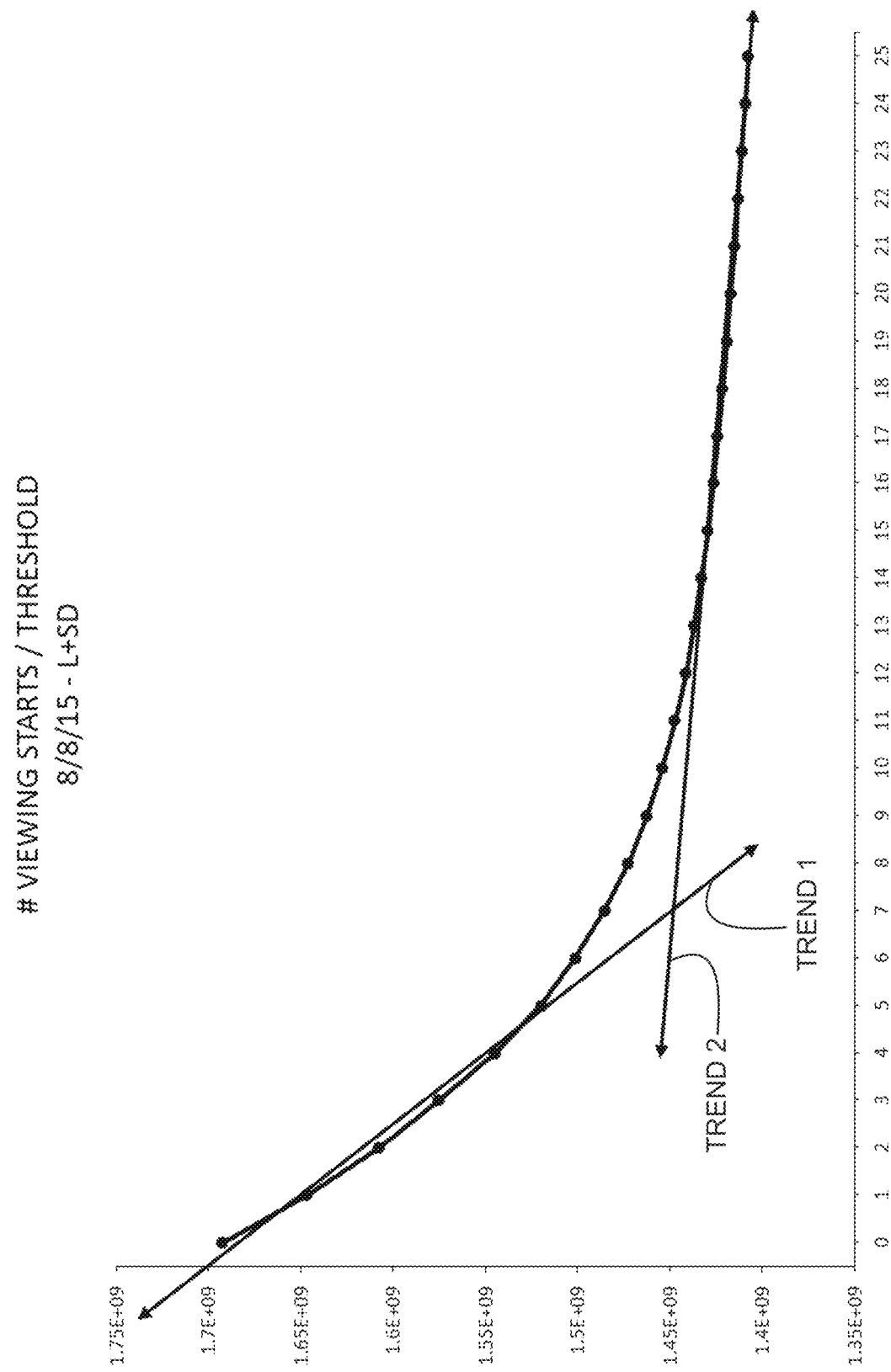
FIG. 13 is a graph of an example of total viewing starts (Live, DVR, VOD) across all mapped programs and episodes (pgm/epsds) for a specific date (live/same day viewing only).

FIG. 13 shows a graph of a number of non-Internet based media view starts that result from a data set (Table 1) when different thresholds between viewing periods are selected, such graph depicting an example of a method that may be used to select a view threshold for viewing starts. In accord with the examples herein, any past, present and future methods for data analysis or statistical data analysis may be used to characterize the underlying data including, but not limited to, sampling statistics (survey sampling and analysis), statistical models, curve fitting, line fitting, least squares, linear regression, generalized linear model (GLM), analysis of variance (ANOVA), correlation, or Bayes' theorem.

TABLE 1

| #Viewing Starts/Threshold | |
| --- | --- |
| 0 | 1692171483 |
| 1 | 1646408645 |
| 2 | 1607386117 |
| 3 | 1574951814 |
| 4 | 1544503596 |
| 5 | 1519693348 |
| 6 | 1500928199 |
| 7 | 1485289747 |
| 8 | 1472115746 |
| 9 | 1462165652 |
| 10 | 1453834436 |
| 11 | 1446894362 |
| 12 | 1441138841 |
| 13 | 1436866587 |
| 14 | 1432761350 |
| 15 | 1429319021 |
| 16 | 1426080045 |
| 17 | 1423703238 |
| 18 | 1421327528 |
| 19 | 1418818501 |
| 20 | 1416786584 |
| 21 | 1414616698 |
| 22 | 1412780840 |
| 23 | 1410864749 |
| 24 | 1409122950 |
| 25 | 1407403263 |

In some examples, the threshold for determining non-Internet based media viewing Starts is determined by approximating a length of time between viewing periods that are perceived to define different viewing behaviors. For example, FIG. 13 shows two trends ("Trend 1" and "Trend 2") based on aggregate viewer data. These trends are able to be used to identify different viewing behaviors. As shown in FIG. 13, "Trend 1" is taken to represent a first behavior in which a viewer is reasonably likely to return to a program that was previously viewed. Conversely, "Trend 2" of FIG. 13 is taken to represent a second behavior in which a viewer is relatively less likely to return to the program. The intersection of FIG. 13's Trend 1 and Trend 2 itself represents a view threshold between viewing segments (media access segments), between about 7-8 minutes, wherein viewer behavior is determined to generally transition from a first behavior to a second behavior. In accordance with this particular example data set, a view threshold between viewing segments could then be set to be, for example, 7 minutes or 8 minutes, and viewing segments for media occurring beyond that view threshold could be considered different views and different view starts consistent with the teachings herein.

Figure 14:
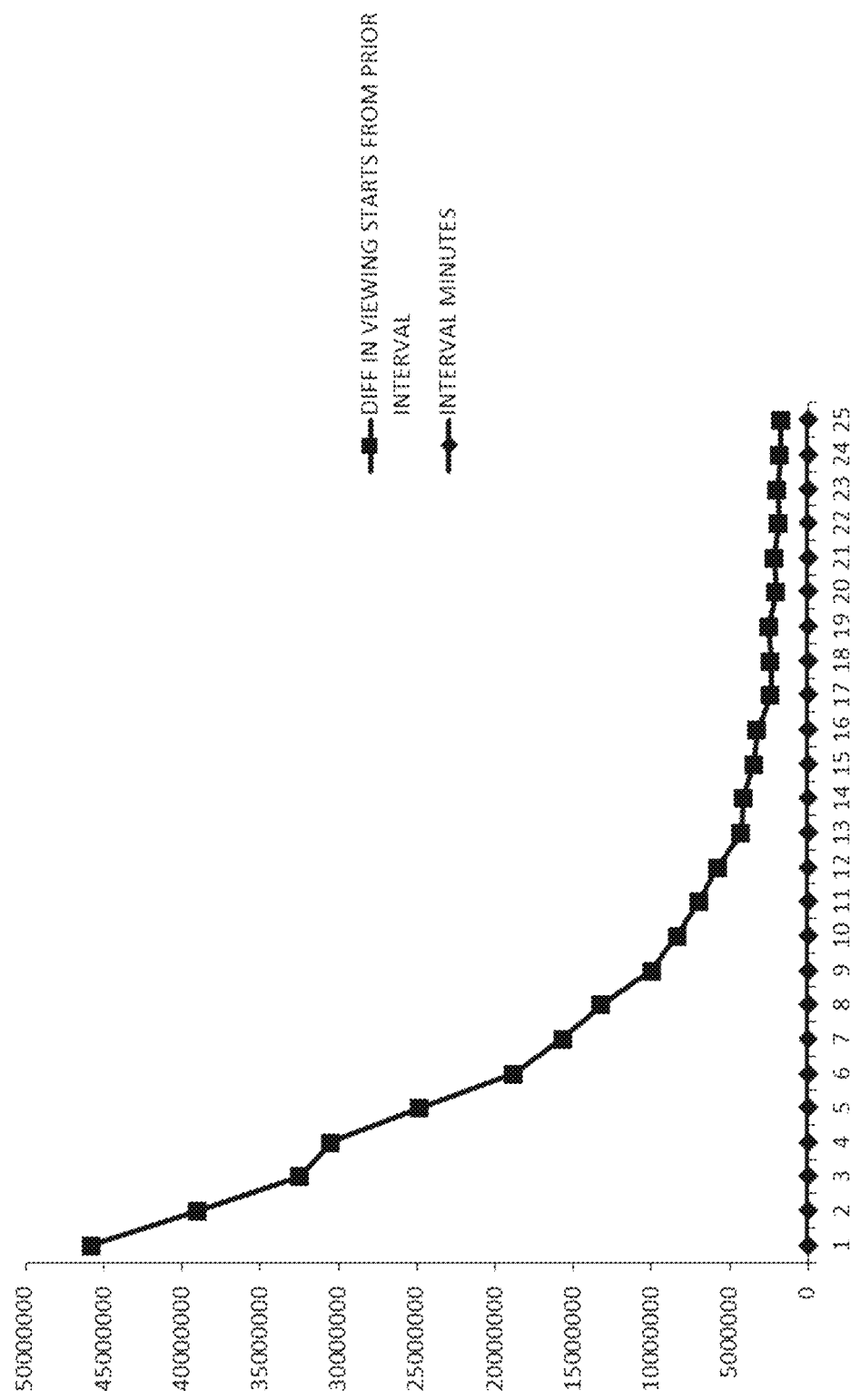
FIG. 14 is a graph of example differences in viewing starts from a prior Interval.

In another example, shown in the graph of FIG. 14, which is drawn from the data in Table 2, below, a view threshold is determined using measured differences in non-Internet based media viewing starts between one interval to the next, such as the difference in non-Internet based media viewing starts between 0 minutes and 1 minute, the difference in non-Internet based media viewing starts between 1 minute and 2 minutes, etcetera.

TABLE 2

| Interval Minutes | Difference in viewing starts from prior interval |
| --- | --- |
| 1 | 45762838 |
| 2 | 39022528 |
| 3 | 32434303 |
| 4 | 30448218 |
| 5 | 24810248 |
| 6 | 18765149 |
| 7 | 15638452 |
| 8 | 13174001 |
| 9 | 9950094 |
| 10 | 8331216 |
| 11 | 6940074 |
| 12 | 5755521 |
| 13 | 4272254 |
| 14 | 4105237 |
| 15 | 3442329 |
| 16 | 3238976 |
| 17 | 2376807 |
| 18 | 2375710 |
| 19 | 2509027 |
| 20 | 2031917 |
| 21 | 2169886 |
| 22 | 1835858 |
| 23 | 1916091 |
| 24 | 1741799 |
| 25 | 1719687 |

Figure 15:
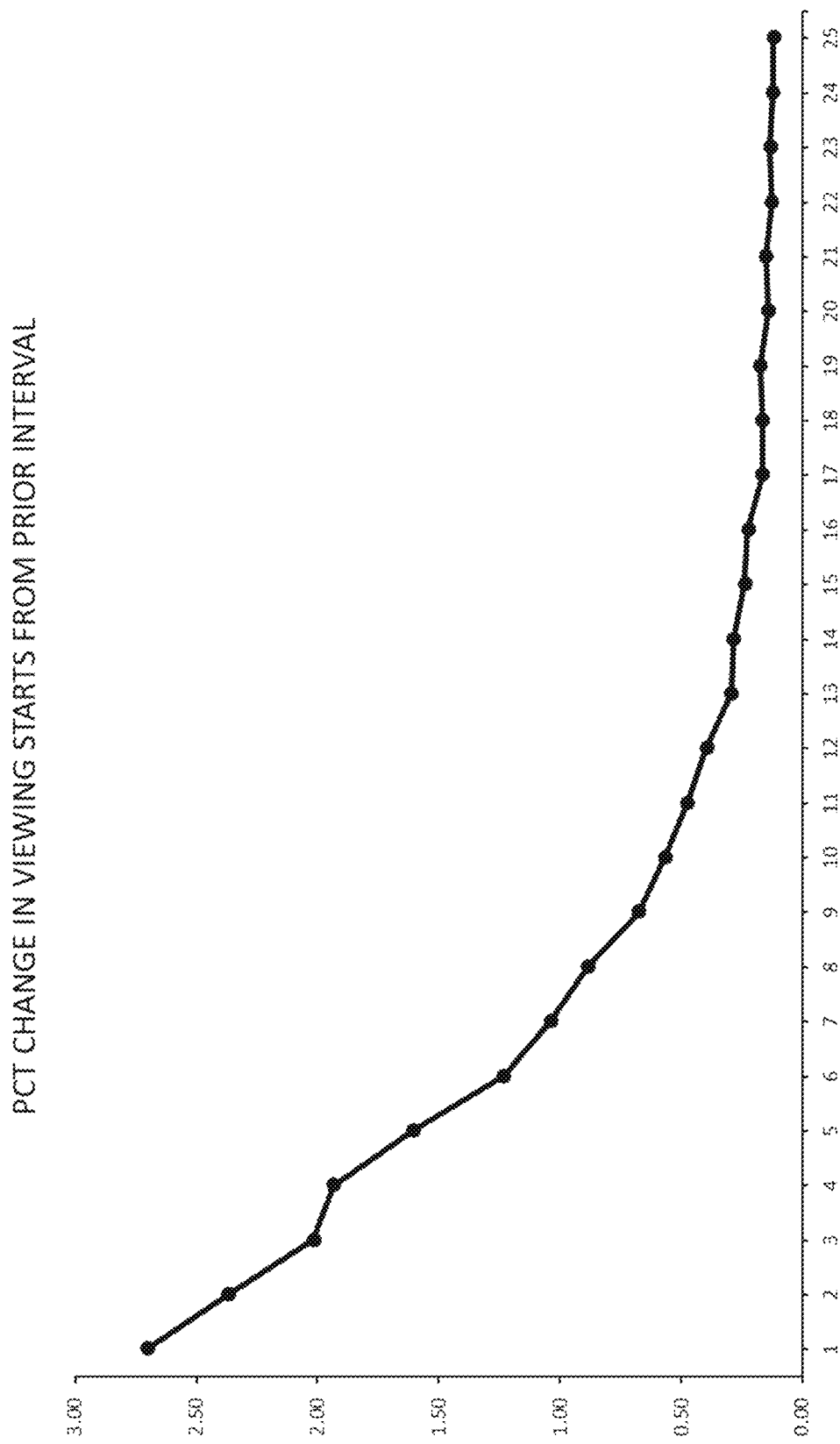
FIG. 15 is a graph of an example of a percent change in viewing starts from a prior Interval.

In yet another example, shown in the graph of FIG. 15, which is drawn from the data in Table 3, below, a view threshold is determined via the percentage difference in non-Internet based media viewing starts between one interval to the next in Table 1 and FIG. 13, such as the percentage difference in non-Internet based media viewing starts between 0 minutes and 1 minute, the percentage difference in non-Internet based media viewing starts between 1 minute and 2 minutes, etcetera.

TABLE 3

| Interval Minutes | PCT change in Viewing Starts from prior interval |
| --- | --- |
| 1 | 2.7043854 |
| 2 | 2.3701605 |
| 3 | 2.0178290 |
| 4 | 1.9332793 |
| 5 | 1.6063574 |
| 6 | 1.2347984 |
| 7 | 1.0419187 |
| 8 | 0.8869651 |
| 9 | 0.6759043 |
| 10 | 0.5697861 |
| 11 | 0.4773634 |
| 12 | 0.3977845 |
| 13 | 0.2964499 |
| 14 | 0.2857076 |
| 15 | 0.2402584 |
| 16 | 0.2266097 |
| 17 | 0.1666672 |
| 18 | 0.1668683 |
| 19 | 0.1765270 |
| 20 | 0.1432119 |
| 21 | 0.1531555 |
| 22 | 0.1297778 |
| 23 | 0.1356255 |
| 24 | 0.1234561 |
| 25 | 0.1220395 |

Figure 16:
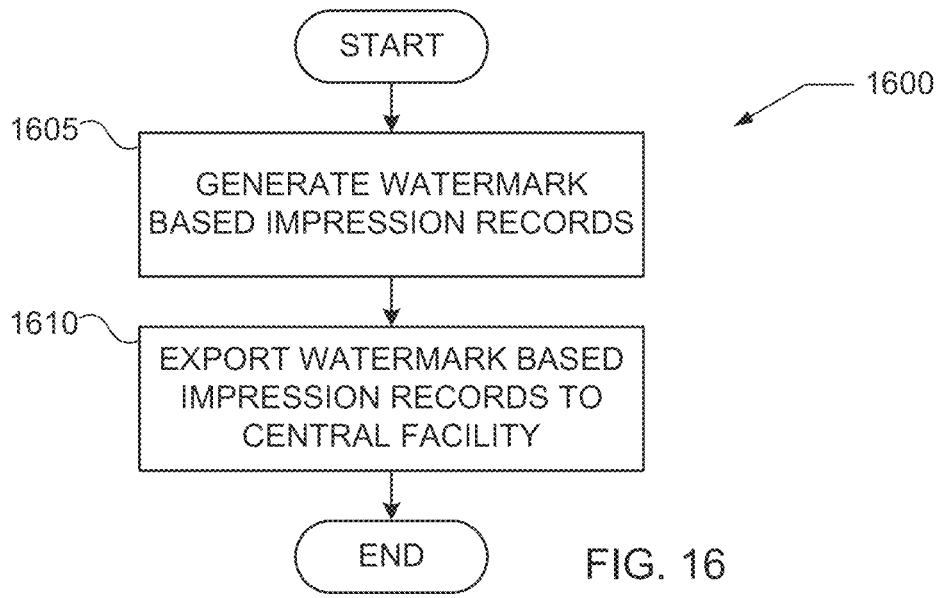
FIG. 16 is a flowchart representative of example machine readable instructions which may be executed to generate watermark based impression records.
Figure 17:
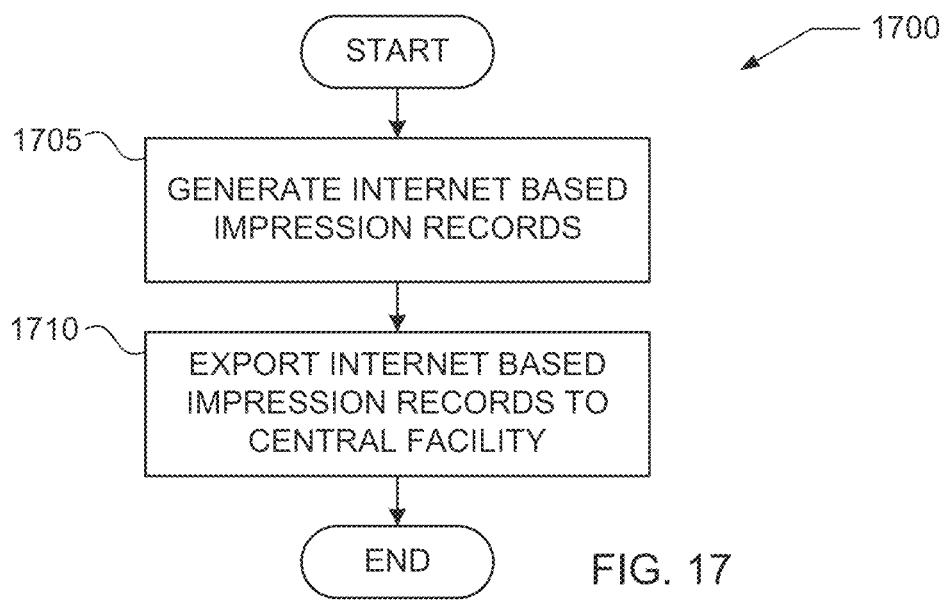
FIG. 17 is a flowchart representative of example machine readable instructions which may be executed to generate Internet based impression records.

Flowcharts representative of example machine readable instructions which may be executed to implement the example watermark based media impression handler 150 of FIGS. 1-2 are shown in FIGS. 16-18. In these examples of FIGS. 16-18, the machine readable instructions comprise a program for execution by a processor such as the processor 612 shown in the example processor platform 600 discussed below in connection with FIG. 20. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 16-18, many other methods of implementing the example watermark based media impression handler 150 and/or the view counter 154 may alternatively be used. For example, the order of execution of the blocks may be changed, and/or some of the blocks described may be changed, eliminated, or combined.

As mentioned above, the example processes of FIGS. 16-18, or other processes disclosed herein, may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 16-18, or other processes disclosed herein, may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 16 is a flowchart representative of example machine language instructions 1600 that may be executed to implement the example watermark based media impression handler 150 of FIGS. 1-2 to generate view metrics in accordance with the teachings herein. In the example program 1600, the meter 108*b* of the example media presentation environment 102*b*, shown in FIG. 1, is adapted to receive watermarked media (e.g., media having a sequence of bits or data, an audio code, etc. inserted periodically into an audio stream) via the terrestrial media provider 120A and generate watermark based impression records corresponding to the media accessed or viewed by the panelist(s) 101*b* (Block 1605). For example, in FIG. 3, the watermarked media is identified by the meter 108*b*, via the watermarks, to correspond to media P1E1. Further, the watermarks may bear encoded information relating to source identification to each content provider or distribution source so as to uniquely identify, for example, the distribution source. Consistent with FIG. 1, these watermark based impression records corresponding to media viewed by the panelist(s) 101*b* over an interval of interest are exported to the central facility 104 (Block 1605) where they are processed by the example watermark based media impression handler 150.

FIG. 17 is a flowchart representative of example machine readable instructions 1700 that may be executed to generate Internet based impression records (Block 1705) utilizable in combination with the example watermark based media impression handler 150 of FIGS. 1-2 to generate Total Content Ratings (TCR) utilizing a single set of metrics for video content ratings across all platforms where the content is consumed. Internet based media is not watermarked in the manner in which terrestrial broadcast television is watermarked. Instead, in the example program 1700 of FIG. 17, the meter 108*a* of the example media presentation environment 102*a* is adapted to receive characteristic data (e.g., HTTP data, meta tags, metadata, etc.) identifying the media. The metadata includes, for example, the purpose of the data, time and date of creation of the data, copyright information, creator information, keywords, location on a computer network where the data was created, standards used, file size, media format, etcetera. Unlike terrestrial media wherein the watermarks are contained within the media itself, which allows precise determination of which MOP is being viewed, the Internet based media is stored separately than its corresponding metadata. Moreover, such audio typically does not include timestamps through the audio stream, which prevents collection of specific MOPs of the measured media. The meter 108A may further comprise an active/passive meter (A/P) configured to passively identify the media, by signature/fingerprint, should the media fail to be identified via active (coding) techniques (e.g., media lacking identifiable watermarks, etc.). The passive identification includes, for example, sampling of audio streams using the meter 108*a* and comparing the samples (or characterizations of the samples—sometimes referred to as signatures) to one or more databases (e.g., a central database in the central facility 104, etc.) for a match to identified media. For example, were the media to be viewed via the Internet, and the watermarks identifying the media (e.g., as P 1E1) were unavailable for any reason, the program can be identified passively using one or more audio and/or video systems. The meter 108*a* exports the internet based impression records, corresponding to the Internet-based media accessed or viewed by the panelist(s) 101*a* over an interval of interest, to the central facility 104 (Block 1710).

FIG. 18 is a flowchart representative of example machine readable instructions 1800 which may be executed, via the example watermark based media impression handler 150 of FIG. 1, which includes the example record locator 152, the example view counter 154 and the example media creditor 156, to compare a television provider audience to an Internet based audience to generate Total Content Ratings (TCR) utilizing a single set of metrics for video content ratings across all platforms where the content is consumed.

The example program 1800 begins when the example viewing segment collector 213 of the example view counter 154 obtains impression records for a panelist (Block 1805) selected from the population of panelists 101a-101n from the example media presentation environments 102A-102N, wherein N is any integer. The example viewing segment collector 213 determines whether the impression records obtained from the panelist correspond to watermarked media (Block 1810).

For purposes of illustration, the description of FIG. 18 is supplemented below by an example data set of a population of 6 example panelists, wherein TABLE 4 corresponds to non-Internet based media (e.g., TV data collection or television provider audience impression records collected via example meters 108a-108n of FIG. 1, etc.) and TABLE 5 corresponds to Internet based media (e.g., digital viewing data collected via example meters 108a-108n of FIG. 1, or other meters, sources or digital devices including computers, smartphones, tablets, portable media players and connected devices and corresponding data (native or weighted) provided thereby (e.g., via software developer kit (SDK) based tools, CMS tags, ID3 tags, etc.) and/or data provided through third party providers.

TABLE 4

(non-Internet based media)

| Person ID | Originator | Program | Start Time | End Time |
|---|---|---|---|---|
| P1 | CBS | BBT | 9:00 | 9:10 |
| P1 | CBS | BBT | 9:12 | 9:22 |
| P2 | CBS | BBT | 9:00 | 9:20 |

TABLE 5

(Internet based media)

| Person ID | Originator | Program | Start Time | End Time |
|---|---|---|---|---|
| P2 | CBS | BBT | 9:00 | 9:20 |
| P2 | CBS | BBT | 9:22 | 9:30 |
| P3 | CBS | BBT | 9:12 | 9:22 |

If a watermark is identified (Block 1810 returns a result of YES), the example viewing segment sorter 214 identifies the media corresponding to the watermark. In the example provided above in TABLES 4-5, the media corresponding to the watermark is determined to be the CBS program "The Big Bang Theory" (BBT)). Following this identification of the media corresponding to the watermark (e.g., television media) by the example viewing segment sorter 214, the example the example viewing segment classifier 215 converts the watermark based impression records to media compatible impression records (Block 1825) corresponding to another media (e.g., Internet), such as is shown in FIG. 19, discussed below. In one example, this is accomplished by collecting all viewing segments of a specific piece of content for a particular panelist for a relevant period of measurement using the viewing segment collector 213 and chronologically sorting the viewing segments using the viewing segment sorter 214 (e.g., sorting the viewing segments 700a-700c in FIG. 7 for media P1E1), followed by conversion of the watermark based impression records to media compatible impression records by the example viewing segment classifier 215.

With respect to the example of TABLES 4-5, above, the viewing segment collector 213 collects all viewing segments of a specific piece of content (e.g., BBT) for a particular panelist (e.g., P1) for a relevant period of measurement (e.g., BBT, broadcast between 9:00-9:30 pm on Day 1). The viewing segment sorter 214 chronologically sorts the viewing segments by collecting the first viewing segment for P1 starting at 9:00 and ending at 9:10 and collecting the second viewing segment starting at 9:12 and ending at 9:22 (20 minutes with no break), indicating that panelist P1 either paused the media or moved to a different media content for 2 minutes before resuming watching the same media (BBT) for another 10 minutes.

Then, the example viewing segment classifier 215 combines the viewing segments when the time between the segments is less than a determined viewing threshold and classifies such combined viewing segments as one view (e.g., combining viewing segments 700a-700c in FIG. 7 into one view). In this example, the example view start designator 216 designates one view start and resulting duration to each view. With respect to the example of panelist P1 in TABLES 4-5, in relation to the flowchart 1900 of FIG. 19 and in accordance with an example viewing threshold of 20 minutes, the first and second viewing segments would be combined and classified as one view.

In one example, the example view counter 154 then determines if the impression records converted in Block 1825 represent the last panelist in a population of N panelists (Block 1835). If the panelist is not the last panelist in a population of N panelists (Block 1835 returns a result of NO), the example view counter 154 returns control to Block 1805 for further processing. In the example provided above in TABLES 4-5, following treatment of the first and second impression records of panelist P1 by the example viewing segment collector 213, the example viewing segment sorter 214, the example viewing segment classifier 215, and the example view start designator 216, Block 1835 would return a result of NO and control would return to Block 1805 for further processing of the impression records of panelist P2, including collecting the first viewing segment for P2 starting at 9:00 and ending at 9:20.

If the impression records for a panelist are not watermark based (Block 1810 returns a result of NO), the impression records corresponds to Internet based audience impression records, the example Internet-based media impression handler 151 identifies the media (e.g., a time-shifted streaming of a particular BBT episode) corresponding to the Internet based impression records (Block 1820) using conventional techniques for evaluating Internet-based media impressions. In the example provided above in TABLES 4-5, following treatment of the first impression record of panelist P2, the non-Internet based first viewing segment, the example Internet-based media impression handler 151 processes the second impression record of Block 1805, an Internet based impression record with a viewing segment for P2 starting at 9:22 and ending at 9:30 (e.g., following the initial view of 20 minutes, the panelist P2 re-loaded the web page or app for 2 minutes before resuming watching the same program for another 8 minutes), using conventional techniques for evaluating Internet-based media impressions. Then, the example program 1800 proceeds to recursively process the third Internet based impression record, a viewing segment for P3 starting at 9:12 and ending at 9:20 (10 minutes without breaking). The Internet based impression records (Block 1830) are evaluated by the example Internet-based media impression handler 151, using conventional techniques for evaluating Internet-based media impressions, to determine if the Internet based impression records processed in Block 1830 represent the last panelist in a population of N panelists (Block 1840). If the panelist is not the last panelist in a population of N panelists (Block 1840 returns a result of NO), control returns to Block 1805 for further processing by the example Internet-based media impression handler 151 using conventional techniques for evaluating Internet-based media impressions. In the example provided above in TABLES 4-5, following treatment of the third impression record of panelist P2, the Internet based third viewing segment, Block 1840 returns a result of NO and the control returns to Block 1805 for further processing, wherein the example Internet-based media impression handler 151 collects the impression record associated with panelist P3, an Internet based impression record with a viewing segment starting at 9:12 and ending at 9:22.

Following processing of all impression records for all N panelists, in Block 1860, the example media creditor 156 uses the impression records from Block 1845 and Block 1850 to respectively generate television audience measurement metrics using the Internet-based media compatible impression records from Block 1825 and to generate internet based audience measurement metrics by comparing and/or unifying the impression records from the television audience and the Internet audience to determine audience metrics for the populations of panelists in both media platforms (e.g., television, Internet, etc.), or in sub-portions thereof.

By way of example, with reference to the above-noted example provided above in TABLES 4-5, a broadcast of a particular Big Bang Theory episode and time-shifted streaming of that particular Big Bang Theory episode, direct comparisons of the viewing data is performed (e.g., comparison of Average Audiences ("AA"), determined in some examples as total viewed duration/(media length * universe estimate), where the universe estimate is the total persons or homes in a given population). As another example, Average Minute Audience ("AMA") for an average number of individuals or homes or other target group viewing a particular media in one or more platforms can be calculated across both non-Internet based media and Internet based media.

With reference to the example of TABLES 4-5, above, Table 6 shows example metrics for the non-Internet based media and TABLE 7 shows metrics for the Internet based media.

TABLE 6

(non-Internet based media)

| Originator | Program | Views | Time Spent | Unique Audience | Media Length | AA Projection |
|---|---|---|---|---|---|---|
| CBS | BBT | 2 | 40 | 2 | 20 | 2 |

TABLE 7

(non-Internet based media)

| Originator | Program | Views | Time Spent | Unique Audience | Media Length | AA Projection |
|---|---|---|---|---|---|---|
| CBS | BBT | 3 | 38 | 2 | 30 | 1.27 |

In TABLE 6, the non-Internet based media of TABLE 1 shows that, between panelists P1 and P2, the total number of views was 2, the time spent or total viewed duration was 40 minutes, and the unique audience (unduplicated count of persons) was 2. The media length represents the number of minutes of actual program content aired which, for this example, is 20 minutes. The Average Audience ("AA") Projection is derived by dividing the time spent or total viewed duration by the media length, here 40/20=2.

In TABLE 7, the Internet based media of Table 2 shows that, between panelists P2 and P3, the total number of views (the number of times the media began playing) was 3, the time spent or total viewed duration was 38 minutes, and the unique audience (unduplicated count of persons) was 3. As to the views, for Internet-based media, any time digital media is started (or re-started), it is deemed to be a new view, which results in the example above with 3 views. The media length represents the number of minutes of actual program content aired which, for this example, is 30 minutes. The Average Audience ("AA") Projection is derived by dividing the time spent or total viewed duration by the media length, here 38/30=1.27. It is noted that a panelist could watch the same media over again on a digital device and this could account for a total viewed duration value that is longer than the actual media length. Additionally, media length for the same program can vary across non-Internet based media and Internet based media, as represented by the different media lengths in TABLES 6-7, because media providers may provide different versions of the same media (e.g., a regular version, an extended version, etc.).

Certain metrics, like total viewed duration and views are combinable and are simply summed up across non-Internet based media and Internet based media. For example, the derived data of TABLES 6-7 show that for the BBT non-Internet based media and Internet based media represented, the total viewed duration between the three panelists P1-P3 was 78 minutes and the total views was 5, as shown below in TABLE 8.

TABLE 8

(Combined Internet-based and non-Internet based media)

| Originator | Program | Views | Time Spent | Unique Audience | Media Length | AA Projection |
|---|---|---|---|---|---|---|
| CBS | BBT | 5 | 78 | 3 | 24.87 | 3.14 |

The media length is calculated, in this example, an ((non-Internet based media time spent*non-Internet based media media length)+(Internet based media time spent*Internet based media media length))/(non-Internet based media time spent +Internet based media time spent), yielding a media length of 24.87. The AA projection is 3.14, when the time spent (78 minutes) is divided by the derived media length (24.87 minutes).

Reach metrics provide unduplicated audience estimate for various market breaks and demographics. By way of example, reach metrics can represent (1) in non-Internet based media ratings, an unduplicated number of individuals or households exposed to an advertising medium at least once during the average week for a reported time period or (2) in Internet based media usage, the percentage of U.S. Internet users that accessed the Web media of a specific site or property. Reach metrics cannot be directly summed up across non-Internet based media and Internet based media prior to accounting for potential duplication (e.g., the same viewer accessing the same media across both non-Internet based media and Internet based media). The unique audience metric provides weighting that accounts for duplication. Since the panelist P2 in this example consumed the same media on both non-Internet based media and Internet based media devices, the panelist P2 is only counted once when reporting the total audience. For the total audience, media length is derived by duration weighting the different lengths across non-Internet based media and Internet based media, with the AA Projection being derived by dividing the total viewing time ("Time Spent") by the duration weighted media length.

As to Block 1860 of the example program of FIG. 18, not only can the impression records from the non-Internet based audience and the Internet based audience be combined, but they can also, or alternatively, be compared. For instance, in the example of Tables 4-8, the number of views and the total viewed duration of the Internet based audience is greater than that of the non-Internet based audience.

In some examples, a total viewed duration for non-Internet based media is able to be measured with granularity as to a number of seconds of media exposure associated with a particular media or entity for all viewers across a measurement period, and the resulting Average Audience calculation for non-Internet based media (measured in seconds) is then combinable with or reconcilable with corresponding Average Audience calculations performed for Internet-based media, thus enabling calculation of metrics for view of particular media in one or more platforms across both non-Internet based media and Internet based media.

The viewing data of example Tables 1-2, and derived data of Tables 3-4 can further be combined to yield metrics such as an Average Minutes Audience ("AMA"), determined in one example as (total viewed duration)/(media length). For example, in this example of Tables 1-4, the total viewed duration is 78 minutes and the media length is weighted at 24.87 minutes, providing an AA of 78/24.87 or 3.14, meaning that for any given minute of the program, on average, about 3.14 people were watching.

FIG. 19 is a flowchart 1900 representative of example machine readable instructions which may be executed to implement block 1825 of FIG. 18 to convert watermark based impression records (e.g., broadcast television) to Internet-based media compatible impression records. In Block 1905, the example watermark based media impression handler 150, wherever located (e.g., centralized in central facility 104 as shown in FIG. 1, or distributed) collects all viewing segments of media (e.g., viewing events that come from a meter 108*a*, etc.) for a particular panelist, via the example view counter 154 and the example viewing segment collector 213. These collected viewing segments or media access segments (e.g., 400*a*-400*c* in FIG. 4) are sorted by the viewing segment sorter 214 of the example view counter 154 (e.g., chronologically sorted, etc.) for a particular panelist based on time (Block 1910). The example view counter 154 of the example watermark based media impression handler 150 then determines if an amount of time between adjacent viewing segments is less than a view threshold using the example viewing segment classifier 215 (Block 1915). If an amount of time between adjacent viewing segments is less than and/or equal to a view threshold, the adjacent viewing segments are combined into a single view by the example viewing segment classifier 215 (Block 1920). If an amount of time between adjacent viewing segments is greater than a view threshold, the adjacent viewing segments are classified as different views by the example viewing segment classifier 215 (Block 1925), such as is represented in the examples of FIGS. 3-12. Following this classification of the viewing segments into views by the example viewing segment classifier 215, the example view counter 154 example view start designator 216 attributes one view start, and a duration corresponding to the view start, to each classified view (Block 1930).

The example watermark based media impression handler 150 then determines if a last media has been processed in Block 1935. If Block 1935 returns a result of NO, control returns to Block 1905 where the viewing segment collector 213 collects viewing segments of the next media for the panelist, followed by sorting of the next media by viewing segment sorter 214 in Block 1910, classification of the next media by viewing segment classifier 215 in Blocks 1915, 1920 and 1925, and attribution of one video start and the resulting duration minutes to each view by the view start designator 216 in Block 1930. The example watermark based media impression handler 150 continues such processing of the media until the Block 1935 returns a result of YES, at which point control is passed to Block 1835 for continued processing of all viewing segments from a next panelist and/or all successive panelists in a population by the example watermark based media impression handler 150.

Figure 20:
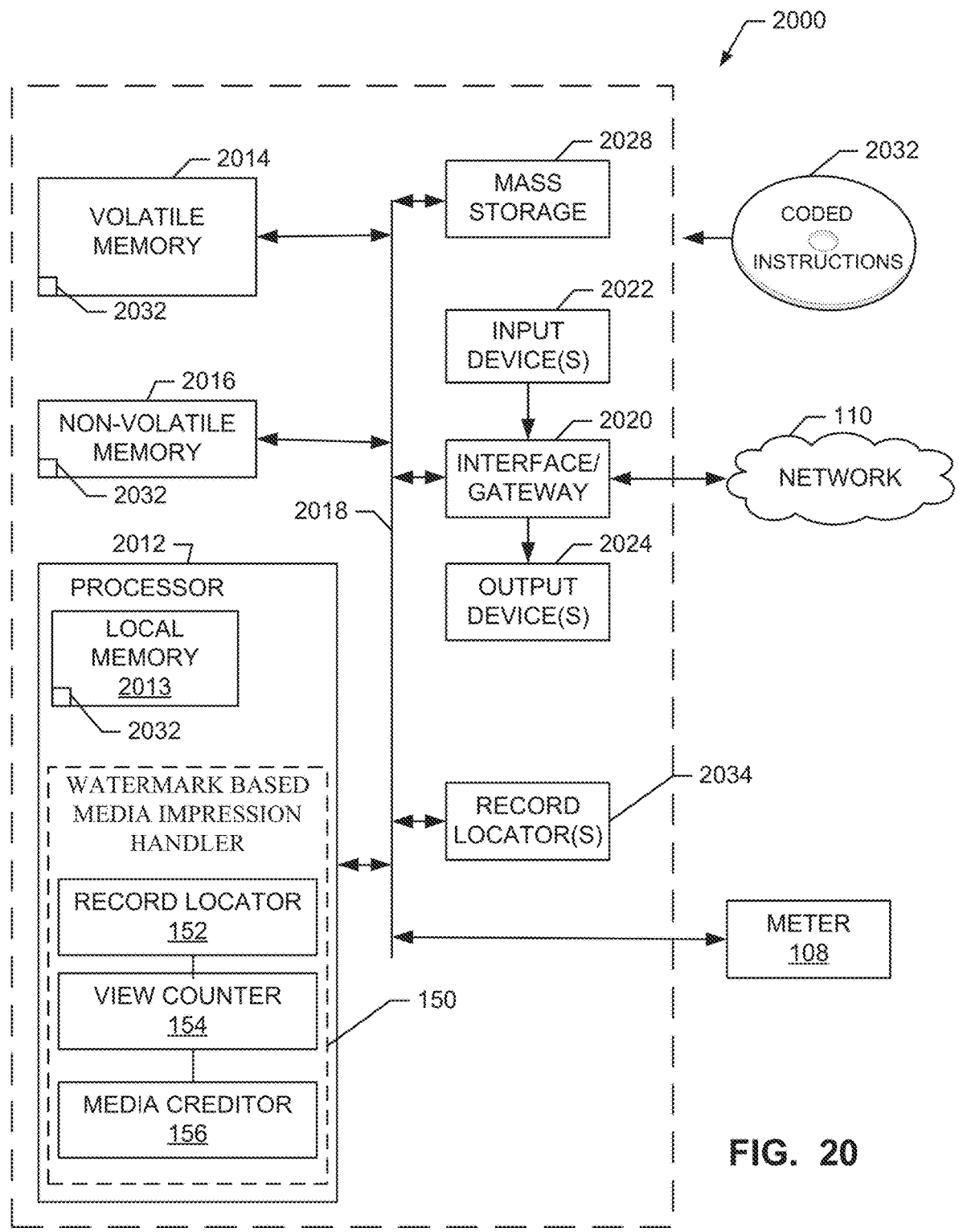
FIG. 20 is a block diagram of an example processor platform which may execute the example instructions of FIGS. 18-19, to implement the example watermark based media impression handler of FIG. 1 and/or the example view counter of FIGS. 1 and/or 2.

FIG. 20 is a block diagram of an example processor platform 2000 capable of executing the instructions of FIGS. 16-18 to implement the example watermark based media impression handler 150 of FIGS. 1-2. In various examples, the processor platform 2000 is, by way of example, a server, a desktop computer, a laptop computer, or a mobile device (e.g., a cell phone, a smart phone, a tablet such as an iPad™), or any other type of computing device.

The processor platform 2000 of the illustrated example includes a processor 2012. The processor 2012 of the illustrated example is hardware. For example, the processor 2012 can be implemented by one or more integrated circuits, logic circuits, microprocessors or controllers from any desired family or manufacturer.

The processor 2012 of the illustrated example includes a local memory 2013 (e.g., a cache). The processor 2012 executes instructions to implement the example watermark based media impression handler 150, the example view counter 154, the example viewing segment collector 213, the example viewing segment sorter 214, the example viewing segment classifier 215, and the example viewing start designator 216 of FIG. 2, or other examples expressly or implicitly disclosed herein. The processor 2012 of the illustrated example is in communication with a main memory including a volatile memory 2014 and a non-volatile memory 2016 via a bus 2018. The volatile memory 2014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2016 may be implemented by flash memory and/or any other desired type of memory device. Access to the main memory 2014, 2016 is controlled by a memory controller.

The processor platform 2000 of the illustrated example also includes an interface circuit 2020. The interface circuit 2020 may be implemented by any type of interface standard, such as an Ethernet interface, a universal serial bus (USB), and/or a PCI express interface.

In the illustrated example, one or more input devices 2022 are connected to the interface circuit 2020. The input device(s) 2022 permit(s) a user to enter data and commands into the processor 2012. The input device(s) can be implemented by, for example, an audio sensor, a microphone, a camera (still or video), a keyboard, a button, a mouse, a touchscreen, a track-pad, a trackball, isopoint and/or a voice recognition system. In the illustrated example of FIG. 17, the example input devices(s) implement inputs to, for example, the example meter 108 and/or device(s) 105 operatively associated therewith.

One or more output devices 2024 are also connected to the interface circuit 2020 of the illustrated example. The output devices 2024 can be implemented, for example, by display devices (e.g., a light emitting diode (LED), an organic light emitting diode (OLED), a liquid crystal display, a cathode ray tube display (CRT), a touchscreen, a tactile output device, a printer, speakers, etc.). The interface circuit 2020 of the illustrated example, thus, typically includes a graphics driver card, a graphics driver chip or a graphics driver processor.

The interface circuit 2020 of the illustrated example also includes a communication device such as a transmitter, a receiver, a transceiver, a modem and/or network interface card to facilitate exchange of data with external machines (e.g., computing devices of any kind) via a network 2026 (e.g., an Ethernet connection, a digital subscriber line (DSL), a telephone line, coaxial cable, a cellular telephone system, etc.).

The processor platform 2000 of the illustrated example also includes one or more mass storage devices 2028 for storing software and/or data. Examples of such mass storage devices 2028 include floppy disk drives, hard drive disks, compact disk drives, Blu-ray disk drives, RAID systems, and digital versatile disk (DVD) drives.

The coded instructions 2032 of FIGS. 16-18 may be stored in the mass storage device 2028, in the local memory 2013, in the volatile memory 2014, in the non-volatile memory 2016, and/or on a removable tangible computer readable storage medium such as a CD or DVD.

From at least the foregoing, it will be appreciated that example methods, apparatus and articles of manufacture disclosed herein provide a "view" metric for the purposes of measuring non-Internet based media audiences in a manner to facilitate cross-platform ratings. Examples disclosed herein determine the view threshold such that the definition of a non-Internet based media view start is similar to an Internet based media view start to enable views to be used for both non-Internet based and Internet based media to, in turn, enable a Total Content Ratings (TCR) utilizing a single set of metrics across all media distribution platforms.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   at least one memory;
   instructions in the apparatus; and
   at least one processor to execute the instructions to:
      access a first media impression record indicative of a first media access segment corresponding to a first start time and a first end time;
      access a second media impression record indicative of a second media access segment corresponding to a second start time and a second end time;
      determine a time period during which media was not presented at a media presentation device between the first and second media access segments based on the first end time of the first media access segment and the second start time of the second media access segment; and
      when the time period does not exceed a threshold, update at least one of the first media impression record or the second media impression record to indicate that the first and second media access segments are associated with a same first media access session, the threshold corresponding to a maximum duration between adjacent media access segments for the adjacent media access segments to be considered part of the same first media access session.

2. The apparatus of claim 1, wherein when the time period exceeds the threshold, the at least one processor is to update the second media impression record to indicate an association between the second media access segment and a second media access session, the second media access session being different from the first media access session corresponding to the first media access segment.

3. The apparatus of claim 1, wherein the at least one processor is to:
   after determining that the first media impression record and the second media impression record correspond to watermarked media, identify the media corresponding to the first media impression record and the second media impression record based on a watermark of the watermarked media; and
   chronologically sort the first media impression record and the second media impression record prior to determining the time period during which the media was not presented at the media presentation device.

4. The apparatus of claim 1, wherein the at least one processor is to:
   after determining that the first media impression record and the second media impression record correspond to a panelist and watermarked media, identify the media corresponding to the first media access segment and the second media access segment based on a watermark of the watermarked media; and
   chronologically sort the first media access segment and the second media access segment corresponding to the panelist prior to determining the time period during which the media was not presented at the media presentation device.

5. The apparatus of claim 1, wherein the at least one processor is to:
   attribute the first start time or the second start time to the first media impression record and the second media impression record; and
   attribute the first end time or the second end time to the first media impression record and the second media impression record, the first media impression record and the second media impression record having a same start time and duration to indicate that the first and second media access segments are associated with the same first media access session.

6. The apparatus of claim 1, wherein the media is first media and the at least one processor is to:
   after determining that a third media impression record and a fourth media impression record do not correspond to watermarked media, identify second media corresponding to the third media impression record and the fourth media impression record; and
   generate an internet-based audience measurement metric based on the third and fourth media impression record.

7. The apparatus of claim 6, wherein the at least one processor is to compare the internet-based audience measurement metric to the first media access segment to determine an audience metric for the first and second media, wherein the first media access segment is an Internet-based media compatible impression record.

8. A non-transitory computer readable storage medium comprising instructions that, when executed, cause at least one processor to at least:
   access a first media impression record indicative of a first media access segment corresponding to a first start time and a first end time;

access a second media impression record indicative of a second media access segment corresponding to a second start time and a second end time;

determine a duration during which media was not presented at a media presentation device between the first and second media access segments, the duration between the first end time of the first media access segment and the second start time of the second media access segment; and when the duration does not exceed a threshold, update at least one of the first media impression record or the second media impression record to indicate that the first and second media access segments are associated with a same first media access session, the threshold representative of a maximum duration between adjacent media access segments to identify the adjacent media access segments as being part of the same first media access session.

9. The non-transitory computer readable storage medium of claim 8, wherein when the duration exceeds the threshold, the instructions are to cause the at least one processor to update the second media impression record to indicate an association between the second media access segment and a second media access session, the second media access session being different from the first media access session corresponding to the first media access segment.

10. The non-transitory computer readable storage medium of claim 8, wherein the instructions are to cause the at least one processor to:

after determining that the first media impression record and the second media impression record correspond to watermarked media, identify the media corresponding to the first media impression record and the second media impression record based on a watermark of the watermarked media; and sort the first media impression record and the second media impression record prior to determining the duration during which the media was not presented at the media presentation device.

11. The non-transitory computer readable storage medium of claim 8, wherein the instructions are to cause the at least one processor to:

after determining that the first media impression record and the second media impression record correspond to a panelist and watermarked media, identify the media corresponding to the first media access segment and the second media access segment based on a watermark of the watermarked media; and sort the first media access segment and the second media access segment corresponding to the panelist before determining the duration during which the media was not presented at the media presentation device.

12. The non-transitory computer readable storage medium of claim 8, wherein the instructions are to cause the at least one processor to:

attribute the first start time or the second start time to the first media impression record and the second media impression record; and attribute the first end time or the second end time to the first media impression record and the second media impression record, the first media impression record and the second media impression record having a same start time and duration to indicate that the first and second media access segments are associated with the same first media access session.

13. The non-transitory computer readable storage medium of claim 8, wherein the media is first media and the instructions to cause the at least one processor to:

after determining that a third media impression record and a fourth media impression record do not correspond to watermarked media, identify second media corresponding to the third media impression record and the fourth media impression record; and generate an internet-based audience measurement metric based on the third and fourth media impression record.

14. The non-transitory computer readable storage medium of claim 13, wherein the instructions are to cause the at least one processor to compare the internet-based audience measurement metric to the first media access segment to determine an audience metric for the first and second media, wherein the first media access segment is an Internet-based media compatible impression record.

15. A method comprising:

determining, by executing an instruction on at least one processor, a time period during which media was not presented at a media presentation device between a first media access segment and a second media access segment based on a first end time of the first media access segment and a second start time of the second media access segment; and after the time period does not exceed a threshold, updating, by executing an instruction on the at least one processor, at least one of a first media impression record or a second media impression record to indicate that the first media access segment corresponding to the first media impression record and the second media access segment corresponding to the second media impression record are associated with a same first media access session, the threshold corresponding to a maximum duration between adjacent media access segments to determine that the adjacent media access segments are part of the same first media access session.

16. The method of claim 15, further including:

after determining that the first media impression record and the second media impression record correspond to watermarked media, identifying the media corresponding to the first media impression record and the second media impression record based on a watermark of the watermarked media; and sorting the first media impression record and the second media impression record before determining the time period during which the media was not presented at the media presentation device.

17. The method of claim 15, further including:

after determining that the first media impression record and the second media impression record correspond to a panelist and watermarked media, identifying the media corresponding to the first media access segment and the second media access segment based on a watermark of the watermarked media; and sorting the first media access segment and the second media access segment before determining the time period during which the media was not presented at the media presentation device.

18. The method of claim 15, further including:

attributing a first start time of the first media access segment or the second start time to the first media impression record and the second media impression record; and attributing the first end time or a second end time of the second media access segment to the first media impression record and the second media impression record, the first media impression record and the second media impression record having a same start time and duration to indicate that the first and second media access segments are associated with the same first media access session.

19. The method of claim 15, wherein the media is first media and further including:
after determining that a third media impression record and a fourth media impression record do not correspond to watermarked media, identifying second media corresponding to the third media impression record and the fourth media impression record; and
generating an internet-based audience measurement metric based on the third and fourth media impression record.

20. The method of claim 19, further including comparing the internet-based audience measurement metric to the first media access segment to determine an audience metric for the first and second media, wherein the first media access segment is an Internet-based media compatible impression record.

\* \* \* \* \*